(12) United States Patent
Fevold et al.

(10) Patent No.: US 11,641,804 B2
(45) Date of Patent: May 9, 2023

(54) BALE DETECTION AND CLASSIFICATION USING STEREO CAMERAS

(71) Applicant: Vermeer Manufacturing Company, Pella, IA (US)

(72) Inventors: Jake Fevold, New York City, NY (US); Edmond Dupont, San Antonio, TX (US); Kristopher Kozak, San Antonio, TX (US); Darin L. Dux, Pella, IA (US); Curt Graham, Pella, IA (US); Kent Thompson, Otley, IA (US)

(73) Assignee: VERMEER MANUFACTURING COMPANY, Pella, IA (US)

( * ) Notice: Subject to any disclaimer, the term of this patent is extended or adjusted under 35 U.S.C. 154(b) by 68 days.

(21) Appl. No.: 17/238,792

(22) Filed: Apr. 23, 2021

(65) Prior Publication Data

US 2021/0342628 A1 Nov. 4, 2021

Related U.S. Application Data

(63) Continuation of application No. 16/302,427, filed as application No. PCT/IB2017/000665 on May 16, 2017, now abandoned.

(Continued)

(51) Int. Cl.
*G06V 10/44* (2022.01)
*G06V 10/50* (2022.01)
(Continued)

(52) U.S. Cl.
CPC ......... *G06V 10/446* (2022.01); *A01D 90/08* (2013.01); *G06T 7/593* (2017.01); *G06V 10/50* (2022.01);
(Continued)

(58) Field of Classification Search
CPC ...... G06V 10/446; G06V 10/50; A01D 90/08; G06T 7/593; G06T 2207/10012; G06T 2207/30188
See application file for complete search history.

(56) References Cited

U.S. PATENT DOCUMENTS 4,076,137 A 2/1978 Kucera
4,204,790 A 5/1980 Baxter
(Continued)

FOREIGN PATENT DOCUMENTS

WO 2014031355 A1 2/2014

OTHER PUBLICATIONS

Ball et al., "Vision-based Obstacle Detection and Navigation for an Agricultural Robot: Navigation for an Agricultural Robot", Journal of Field Robotics, vol. 33, No. 8, Jan. 13, 2016, pp. 1107-1130.
(Continued)

*Primary Examiner* — Ming Y Hon
(74) *Attorney, Agent, or Firm* — Armstrong Teasdale LLP

(57) ABSTRACT

An apparatus comprises a sensor comprising a left camera and a right camera. A processor is coupled to the sensor. The processor is configured to produce an image and disparity data for the image, and search for a vertical object within the image using the disparity data. The processor is also configured to determine whether the vertical object is a bale of material using the image, and compute an orientation of the bale relative to the sensor using the disparity data. The sensor and processor can be mounted for use on an autonomous bale mover comprising an integral power system, a ground-drive system, a bale loading system, and a bale carrying system.

14 Claims, 23 Drawing Sheets

Related U.S. Application Data

(60) Provisional application No. 62/338,781, filed on May 19, 2016.

(51) Int. Cl.
*G06T 7/593* (2017.01)
*A01D 90/08* (2006.01)

(52) U.S. Cl.
CPC ............... *G06T 2207/10012* (2013.01); *G06T 2207/30188* (2013.01)

(56) References Cited

U.S. PATENT DOCUMENTS

| | | |
|---|---|---|
| 4,248,561 A | 2/1981 | Graves |
| 4,396,330 A | 8/1983 | Rozeboom |
| 5,236,294 A | 8/1993 | Willis |
| 5,542,803 A | 8/1996 | Driggs |
| 5,630,689 A | 5/1997 | Willis |
| 7,401,547 B2 | 7/2008 | Degen |
| 9,271,446 B2 | 3/2016 | Bentzinger et al. |
| 9,554,516 B2 | 1/2017 | Thompson et al. |
| 9,560,806 B2 | 2/2017 | Dux et al. |
| 10,264,731 B2 | 4/2019 | Driggs |
| 2003/0226341 A1* | 12/2003 | De Groen .......... A01D 41/1275 56/10.2 R |
| 2005/0058350 A1* | 3/2005 | Dugan ................. G06V 10/242 382/190 |
| 2006/0188143 A1* | 8/2006 | Strassenburg-Kleciak ................. G06T 7/30 382/154 |
| 2009/0268948 A1* | 10/2009 | Zhang .................. G06V 20/588 382/104 |
| 2010/0328682 A1* | 12/2010 | Kotake .................. G01B 11/25 356/620 |
| 2013/0325346 A1* | 12/2013 | McPeek ................ G01B 5/0035 702/2 |
| 2015/0290805 A1* | 10/2015 | Morency ................ B25J 9/1679 700/99 |
| 2017/0016870 A1* | 1/2017 | McPeek ................ G01N 33/025 |
| 2017/0027101 A1* | 2/2017 | Wilkening .......... A01F 15/0833 |
| 2017/0091957 A1* | 3/2017 | Driegen .................... G06T 7/60 |
| 2017/0118918 A1* | 5/2017 | Chaney ............... A01F 15/0883 |
| 2018/0252532 A1* | 9/2018 | Johnson ............... A01B 79/005 |

OTHER PUBLICATIONS

International Search Report and Written Opinion from PCT Application No. PCT/IB2017/000665 dated Oct. 26, 2017, 17 pages.

* cited by examiner

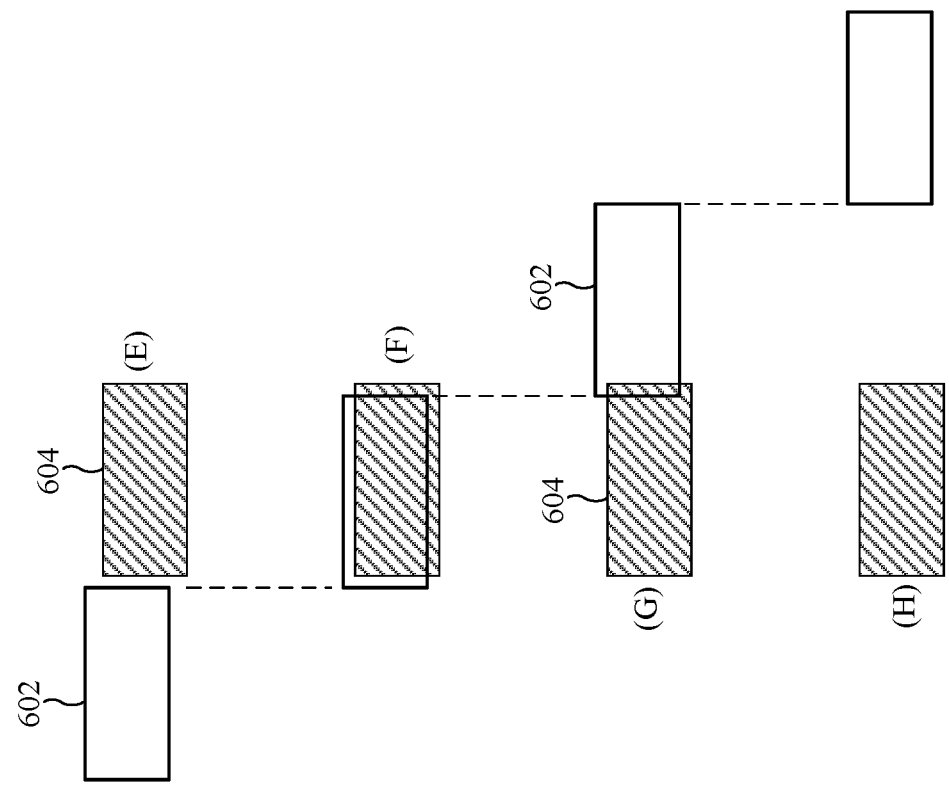
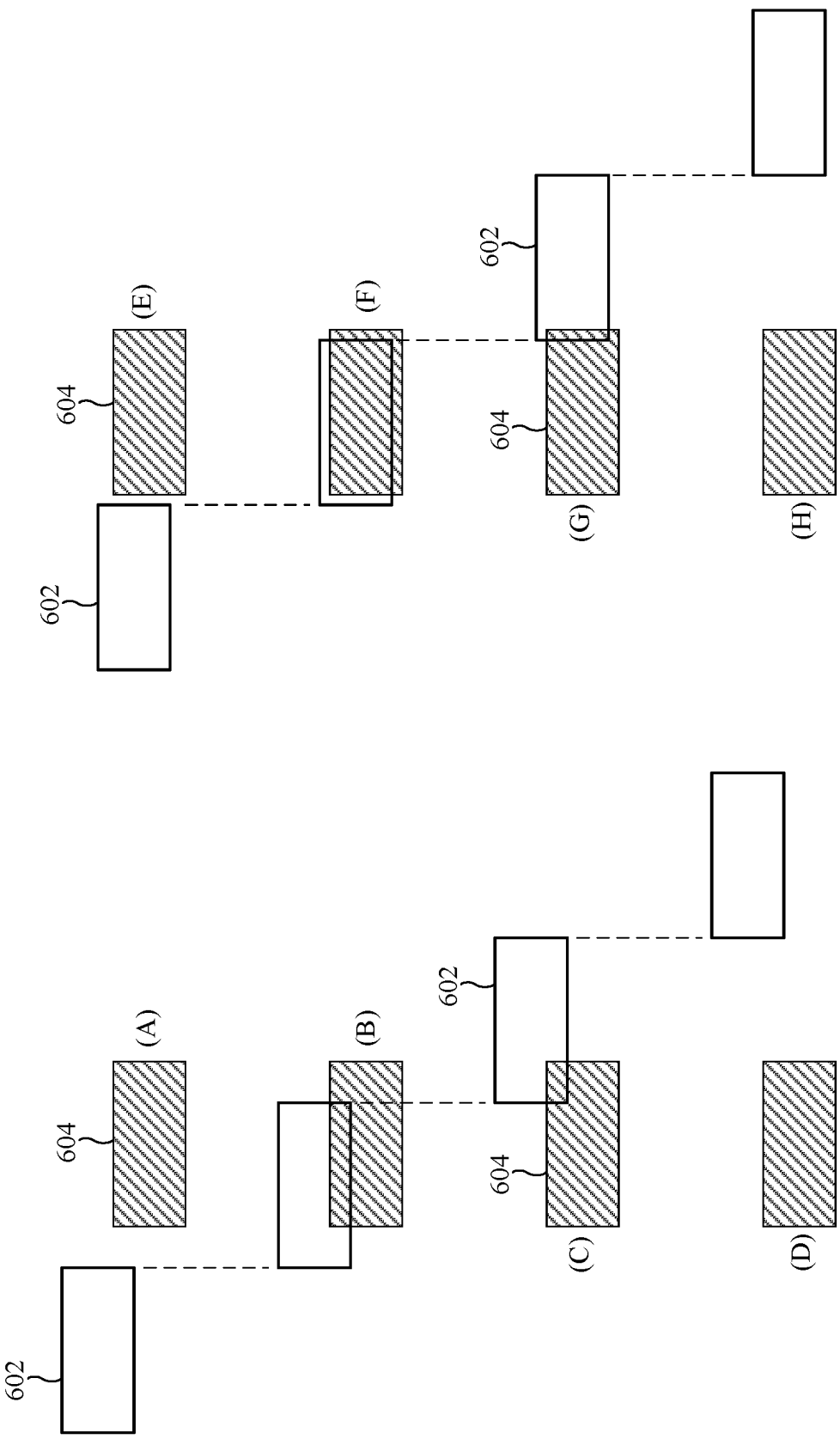

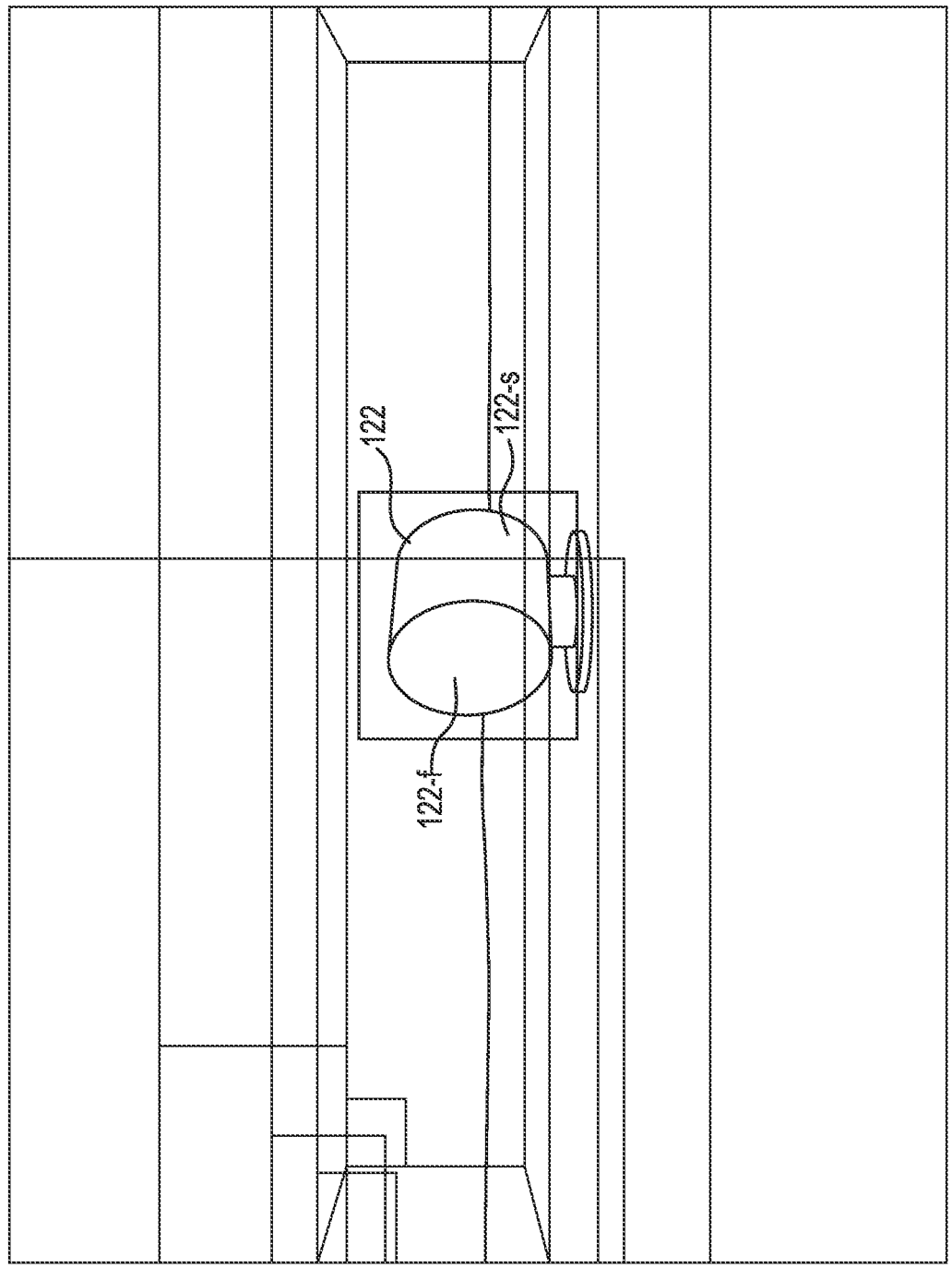

BALE DETECTION AND CLASSIFICATION USING STEREO CAMERAS

CROSS-REFERENCE TO RELATED APPLICATIONS

This application is a continuation of U.S. non-provisional application Ser. No. 16/302,427, filed Nov. 16, 2018, which is a national stage entry of PCT/IB2017/000665, filed May 16, 2017, which claims priority to provisional application Ser. No. 62/338,781, filed May 19, 2016, all of which are incorporated herein by reference in their entirety.

FIELD OF THE INVENTION

The present disclosure is directed to systems and methods for detecting bales of material situated on the ground using a sensor system and, more particularly, to systems and methods for detecting the position and orientation of such bales using stereo cameras. The present disclosure is also directed to an autonomous bale mover configured to automatically detect bales within a specified region using a sensor system, confirm that detected bales are actual bales, pick up individual bales, and transport bales to a specified stacking location.

BACKGROUND OF THE INVENTION

Moving bales of material from a field is a tedious, relatively labor intensive, process that is currently done with a machine, typically a tractor towing a bale mover, or a tractor with a loader, that is controlled by an operator. Recent development of conversion technology is enabling construction of commercial scale systems designed to convert biomass, in the form of agricultural residue, to energy. In this relatively new use, the harvesting process for the agricultural residues introduces new challenges. For example, the process of harvesting and transporting bales of material that was previously left on the ground creates a new labor requirement, when available labor is already scarce. This is combined with the fact that in this situation the amount of time that the bales can be left in the field, before they are moved off the field, is in many situations limited, due to the farmer's need to completer other post-harvest processes, such as tillage and/or fertilizer application. Also, it will be more difficult in the future to find qualified operators that can operate the machines used for moving bales, thus automating this process, to allow machines to run without an operator, will minimize this issue.

Other forms of forage harvesting have similar considerations. For example, when harvesting wet materials that will be ensiled, there is a limited window of time to pick-up and wrap the bales, after they have been baled, to prevent spoilage and dry-matter loss. In this situation, it would also be beneficial to have an autonomous machine that could load the bales off the field and move them from the location where they were deposited by a baler, to a storage position, for wrapping. In these instances, there exists a need for a system that will increase the speed with which bales can be removed from a field, in the context of having limited availability to labor.

SUMMARY OF THE INVENTION

Embodiments are directed to systems and methods for detecting bales of material situated on the ground using a sensor system. Embodiments are also directed to an autonomous bale mover configured to automatically detect bales within a specified region using a sensor system, confirm that detected bales are actual bales, pick up individual bales, and transport bales to a specified stacking location.

According to some embodiments, a method comprises scanning a region of land using a sensor comprising stereo cameras, and producing, by the sensor, an image and disparity data for the image. The method also comprises searching for a vertical object within the image using the disparity data, and determining whether the vertical object is a bale of material using the image. The method further comprises computing an orientation of the bale relative to the sensor using the disparity data.

According to other embodiments, an apparatus comprises a sensor comprising a left camera and a right camera. A processor is coupled to the sensor. The processor is configured to produce an image and disparity data for the image, and search for a vertical object within the image using the disparity data. The processor is also configured to determine whether the vertical object is a bale of material using the image, and compute an orientation of the bale relative to the sensor using the disparity data.

Other embodiments are directed to an autonomous bale mover comprising an integral power system, a ground-drive system, a bale loading system, and a bale carrying system. The autonomous bale mover also comprises a control system capable of providing control signals for the ground-drive system to control the speed of and direction of travel of the bale mover and to control operation of the bale loading system and the bale carrying system. The autonomous bale mover further comprises a sensor system for detecting the position and orientation of bales. The sensor system may be of a type described hereinabove.

Further embodiments are directed to a method implemented with use of an autonomous bale mover of a type described hereinabove. The method comprises defining a region within which the autonomous bale mover operates, and locating bales distributed within the region by the bale mover as the bale mover moves through the region. The method also comprises picking up located bales by the bale mover without stopping, and transporting picked-up bales to a predetermined stacking location within the region by the bale mover. The method further comprises continuing to locate and pick up bales within the region by the bale mover until all bales within the region are transported to the predetermined stacking location.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

BRIEF DESCRIPTION OF THE DRAWINGS

FIGS. 6A and 6B illustrate a sliding window technique for detecting a bale present in an image in accordance with various embodiments;

FIG. 9 shows a representative bale of material having a cylindrical side and circular faces which are subject to detection and mapping using a stereo camera system in accordance with various embodiments, including generating best fit lines through points in the X-plane and the Z-plane, respectively;

Figure 1:
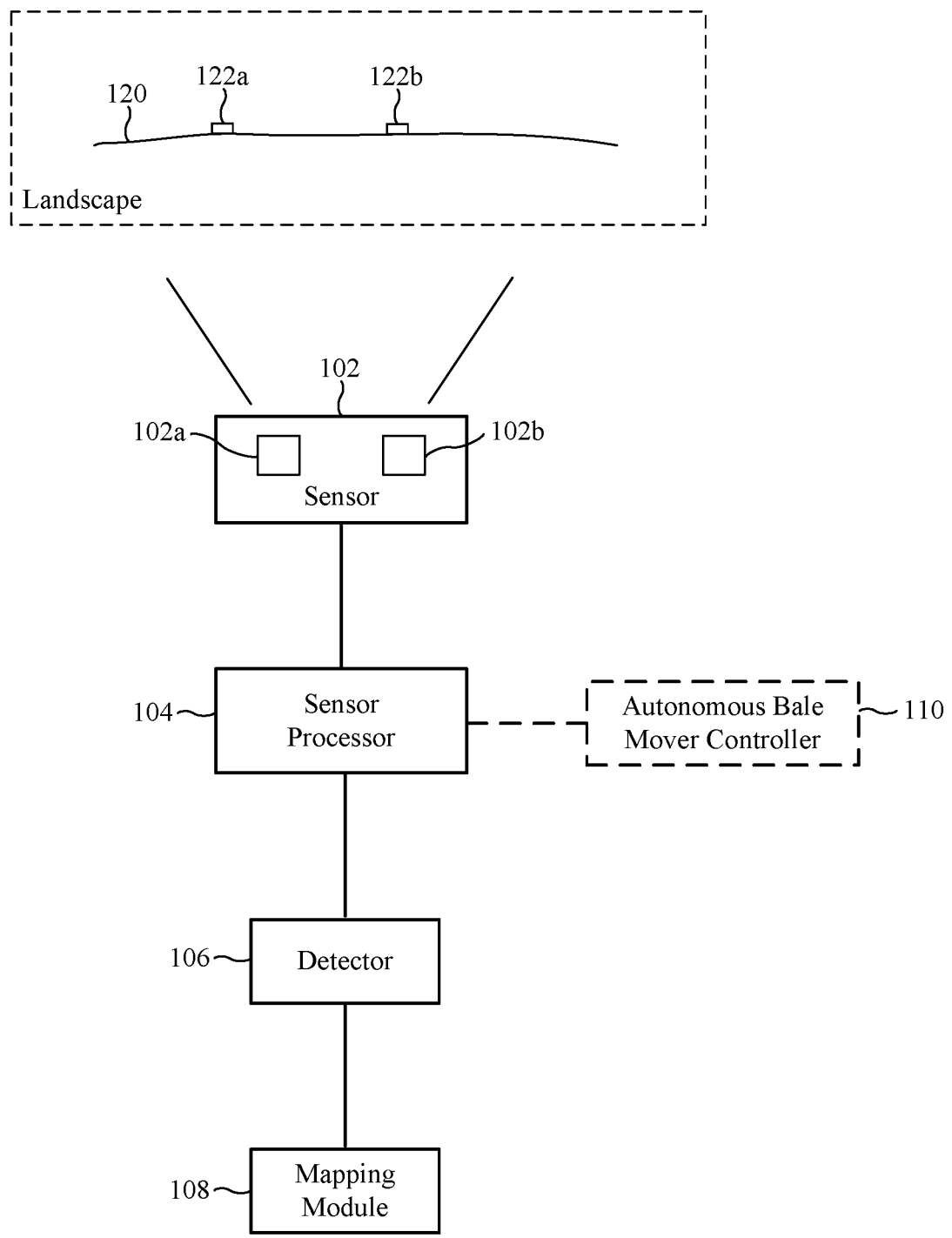
FIG. 1 illustrates a block diagram of a system for detecting and mapping bales of material situated on the ground within a region of land in accordance with various embodiments.

While the invention is amenable to various modifications and alternative forms, specifics thereof have been shown by way of example in the drawings and will be described in detail herein. It is to be understood, however, that the intention is not to limit the invention to the particular embodiments described. On the contrary, the invention is intended to cover all modifications, equivalents, and alternatives falling within the scope of the invention as defined by the appended claims.

DETAILED DESCRIPTION OF VARIOUS EMBODIMENTS

In the following description of the illustrated embodiments, references are made to the accompanying drawings forming a part hereof, and in which are shown by way of illustration, various embodiments by which the invention may be practiced. It is to be understood that other embodiments may be utilized, and structural and functional changes may be made without departing from the scope of the present invention.

Systems, devices or methods according to the present invention may include one or more of the features, structures, methods, or combinations thereof described herein. For example, a device or system may be implemented to include one or more of the advantageous features and/or processes described below. It is intended that such a device, system or method need not include all of the features described herein, but may be implemented to include selected features that provide for useful structures, systems, and/or functionality.

System Overview

FIG. 1 illustrates a block diagram of a system for detecting and mapping bales of material situated on the ground within a region of land in accordance with various embodiments. The system shown in FIG. 1 includes a sensor 102. The sensor 102 includes a stereo camera system comprising a first camera 102a and a second camera 102b. The sensor 102 also includes hardware and software for operating and calibrating the stereo camera system. In FIG. 1, the region of land (e.g., a field) includes a first bale 122a and a second bale 122b situated on the ground 120. The sensor 102 is shown scanning the region of land in order to detect the bales 122a and 122b, confirm that the detected bales are indeed actual bales, and map their pose (e.g., orientation, but may also include both orientation and position). A sensor processor 104 is coupled to the sensor 102 and to a detector 106. The sensor processor 104 and detector 106 cooperate to analyze sensor images and disparity data. The detector 106 is configured to implement feature extraction and classification algorithms to detect potential bales (bale observations) and to confirm that potential bales are actual bales. The poses of actual bales produced by the detector 106 are received by a mapping module 102 (also referred to herein as a world model), which incorporates the bale poses in a map of the region being subject to scanning.

According to some embodiments, the sensor system (blocks 102, 104, 106, and 108) shown in FIG. 1 is an integral component of an autonomous bale moving vehicle, referred to herein as a bale mover. A bale mover has a single intended utility of moving bales that are located throughout a field into a bale storage area located in or near the field. Although the sensor system shown in FIG. 1 is described in connection with an autonomous bale mover, it is understood that the sensor system and methodology disclosed herein can be used in connection with other machines. It is noted that blocks 102, 104, and 106 are components of a perception unit, which is discussed in greater detail hereinbelow (see, e.g., FIG. 19).

The autonomous bale mover is configured to automatically (without human intervention) detect bales within a specified region using the sensor system, confirm that detected bales (bale observations) are actual bales, pick up individual bales, and transport bales to a specified stacking location. The bale mover includes a bale mover controller 110 which is communicatively coupled to the sensor processor 104. The bale mover controller 110 cooperates with the sensor processor 104 to orient the bale mover relative to the face (circular end surface) of a bale as part of a bale pickup operation. After properly orientating itself with the face of the bale, the bale mover picks up the bale and then proceeds to search for another bale in the field.

After a maximum number of bales have been picked up, the bale mover is configured to transport the bales to a specified stacking location. Upon arriving at the specified stacking location, the bale mover is configured to unload the bales. After unloading the bales, the bale mover may then return to the field to pick up more bales. Embodiments of the disclosure are directed to operating on round bales. It is understood that embodiments of the disclosure contemplate detecting bales of a different shape (e.g., square or rectangular bales). Examples of material contained within a bale include hay or corn, among other agricultural materials. Representative bales are described in U.S. Pat. No. 7,401, 547, which is incorporated herein by reference.

System Components

Figure 2:
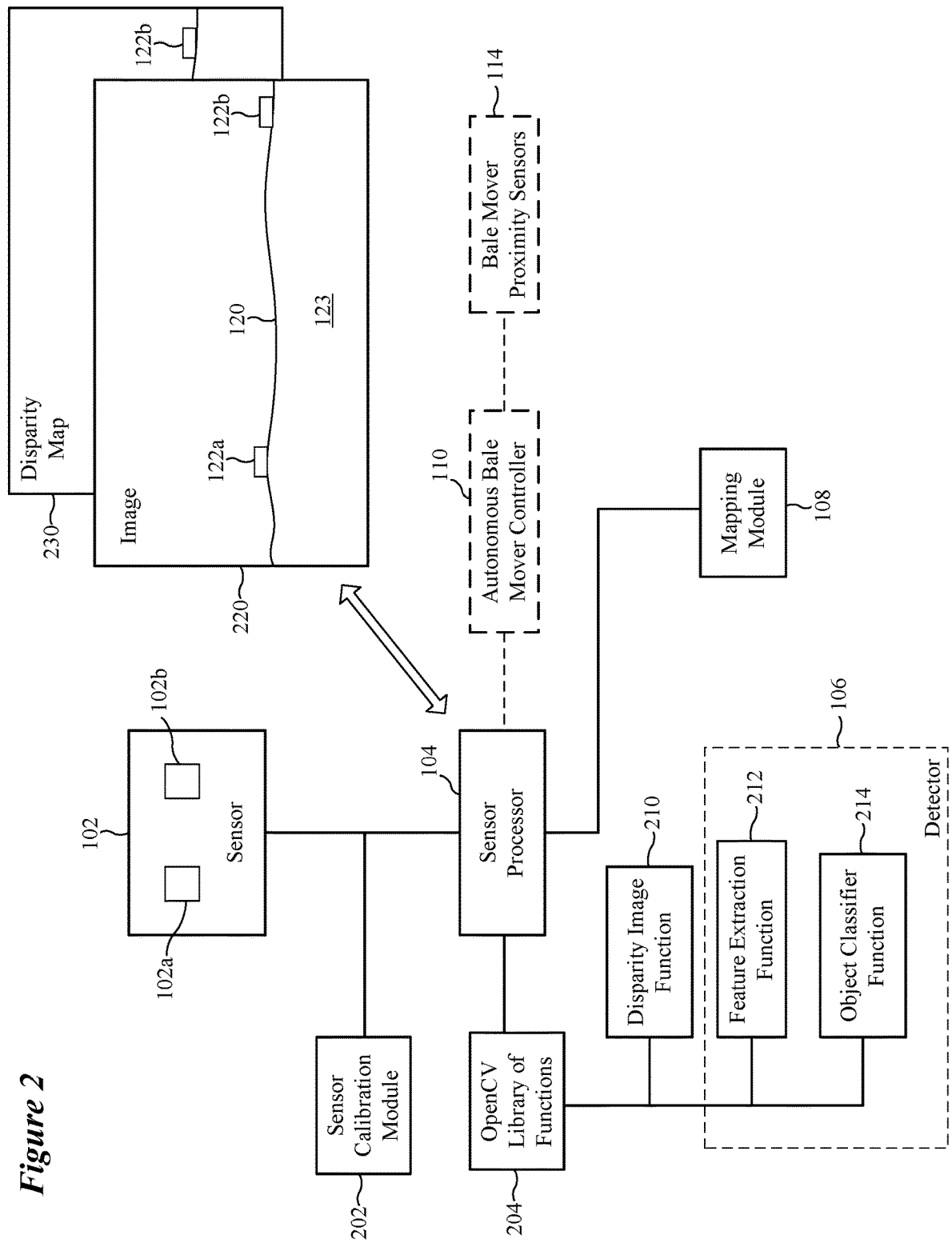
FIG. 2 is a block diagram of a system for detecting and mapping bales of material situated on the ground within a region of land in accordance with various embodiments.

FIG. 2 is a block diagram of a system for detecting and mapping bales of material situated on the ground within a region of land in accordance with various embodiments. The system shown in FIG. 2 includes a sensor 102 which incorporates a stereo camera system comprising a first camera 102a and a second camera 102b. The sensor 102 is coupled to a sensor processor 104 and a sensor calibration module 202. The sensor processor 104 and sensor calibration module 202 cooperate to calibrate the stereo camera system of the sensor 102. For example, calibration of the stereo camera system typically involves estimating the intrinsic (internal lens distortion, focal length, central coordinate, valid pixels) and extrinsic (external translation and rotation between cameras) camera parameters, such that their images can be rectified and the images appear to be parallel to each other.

According to various embodiments, the sensor calibration module 202 uses various function calls defined in an OpenCV function library 204 to generate all of the camera calibration parameters. It is noted that any physical changes in the pair of cameras will require their calibration to be regenerated. OPenCV refers to Open Source Computer Vision, which is a library of programming functions (>500 functions) that support real-time computer vision, including extracting and processing meaningful data from images. The OpenCV library is cross-platform and free to use under an open-source BSD (Berkeley Software Distribution) license. Selected functions of the OpenCV library are stored in the OpenCV function library 204 and accessible by the sensor processor 104 and sensor calibration module 202.

The sensor processor 104 cooperates with the sensor 102 to produce an image 220 and a corresponding disparity map 230 for the image 220. In FIG. 2, the image 220 represents a single frame in which two bales 122a and 122b (and the ground 123 and sky) are captured in the frame. The disparity map 230 corresponds pixel-by-pixel with the image 230 and provides disparity data for each pixel. Disparity refers to the difference in image location of an object seen by the left and the right cameras due to the horizontal separation between the two cameras. More specifically, the disparity of features between two stereo images can be computed as a shift to the left of an image feature when viewed in the right image. The disparity at a given location in the right image is measured in terms of pixels relative to the left image. Disparity and distance from the cameras are inversely related. As the distance from the cameras increases, the disparity decreases. This relationship allows for depth perception in stereo images. Using known techniques, the points that appear in the 2-D disparity image can be mapped as coordinates in 3-D space.

Referring to the sensor 102, the left camera 102a generates a left image and the right camera 102b generates a right image. The sensor processor 104 rectifies the left and right images, which rotates the two images and places them on the same plane. The left and right images can be scaled so that the image frames are the same size. Skew adjustments can also be made to make the image pixel rows directly lineup with each other. According to some embodiments, the sensor processor 104 uses various StereoRectify algorithms in the OpenCV function library 204 to perform the rectification transformation.

Using the rectified left and right images, the sensor processor 104 generates the disparity map 230 for the image 220. The sensor processor 104 generates the disparity map (also referred to as a disparity image or disparity data) using the calibration parameters provided by the sensor calibration module 202. According to some embodiments, the sensor processor 104 uses the Block Matching algorithm in the OpenCV function library 204 to compute the disparity map, shown generally as a disparity image function 210. As a further step, the sensor processor 104 generates a 3-D point cloud reconstruction of the disparity map. According to some embodiments, the sensor processor 104 uses ReprojectImageTo3D in the OpenCV function library 204 and associated arguments to generate a 3-D point cloud from the disparity map.

After generation of the disparity map 230, a detector 106 operates on the image 220 and disparity map 230 to distinguish the bales 122a and 122b from other objects in the image 220. The detector 106 can be implemented to perform feature extraction 212 and object classification 214 in order to make bail observations and detect the bales 122a and 122b as actual bales. The pose of each of the detected bales 122a and 122b can be computed by the sensor processor 104 and stored in a mapping module 108.

As was discussed previously, the sensor system shown in FIG. 2 can be integral to an autonomous bale mover configured to pick up detected bales and transport them to a specified stacking location. In such embodiments, a bale mover controller 110 is coupled to the sensor processor 104 and controls various functions of the bale mover. The bale mover may also include one or more proximity sensors 114 which are also coupled to the bale mover controller 110. The proximity sensors 114, such as LIDAR (e.g., 2-D laser scanner) or ultrasonic sensors, are configured to sense for objects (moving or stationary) in proximity to the bale mover machine during operation. In operation, the bale mover controller 110 can cause the bale mover to reduce speed or stop in response to signals received from the proximity sensors 114 (e.g., due to presence of a vehicle or a person). It is noted that in some embodiments, in addition to helping avoid running into objects in the immediate vicinity, the proximity sensors 114 can be used to help identify and locate bales and to generate a map of objects not to run into, then plan paths around such objects.

Figure 3:
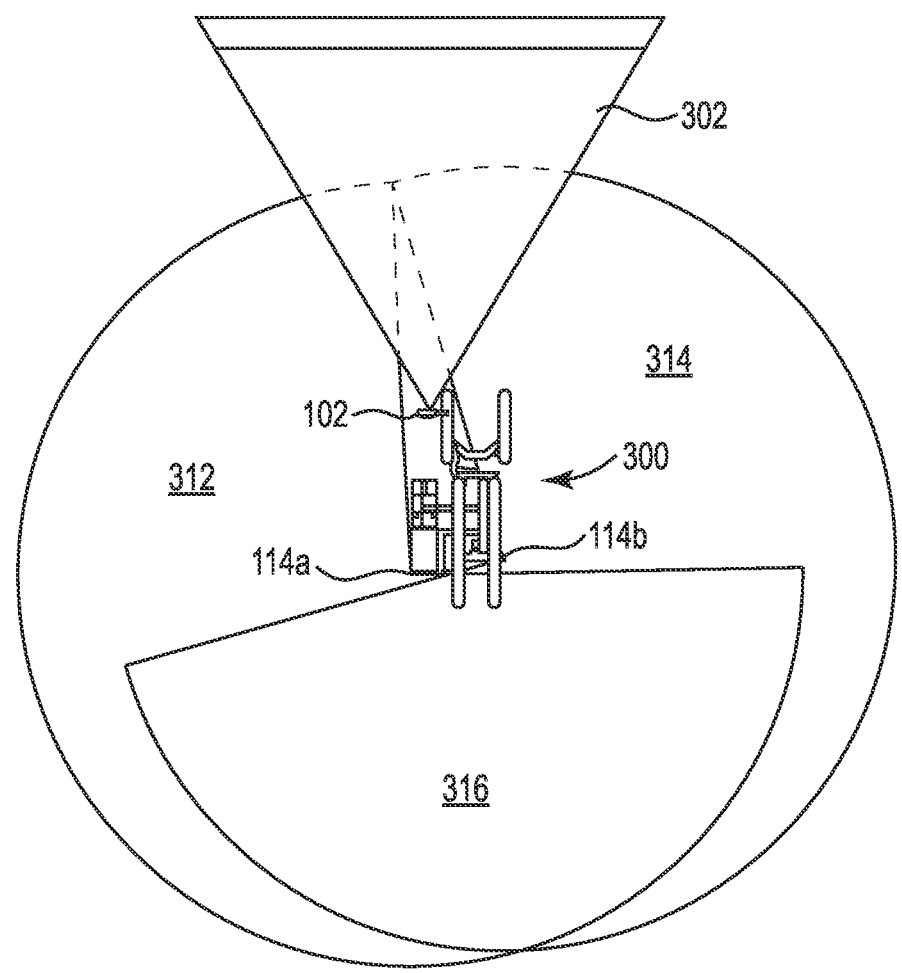
FIG. 3 illustrates an autonomous bale mover equipped with a stereo camera system and proximity sensors in accordance with various embodiments.

FIG. 3 illustrates an autonomous bale mover 300 equipped with a stereo camera system (sensor 102) and proximity sensors 114. In the embodiment shown in FIG. 3, a first proximity sensor 114a is mounted on the left side of the bale mover 300 at the rear of the bale mover's engine assembly. From this mounting location, the first proximity sensor 114a has a field of view of about 270°, which is shown as the combination of detection zones 312 and 316 in FIG. 3. As shown in FIG. 3, the first proximity sensor 114a has a detection zone that extends from a 12:00 position to a 3:00 position moving counterclockwise from the 12:00 position.

The second proximity sensor 114b is mounted on the right side of the bale mover 300 at an upper rear location. From this mounting location, the second proximity sensor 114b has a field of view of about 180°, which is shown as detection zone 314 in FIG. 3 (noting that zone 316 overlaps the lower half of zone 314). As shown in FIG. 3, the second proximity sensor 114b has a detection zone that extends from a 12:00 position to a 6:00 position moving clockwise from the 12:00 position.

The two proximity sensors 114a and 114b provide for a full 360° of proximity detection around the bale mover 300, with an overlapping zone 316 (between 3:00 and 6:00 positions) located behind and to the right side of the bale mover 300. The sensor 102 comprising the stereo camera system is shown mounted on the left forward side of the bale mover 300. The stereo camera system can have a field of view 302 of between about 60° and 100° (e.g., 62°), which allows for a wide scanning area.

Bale Detection and Classification

Figure 4:
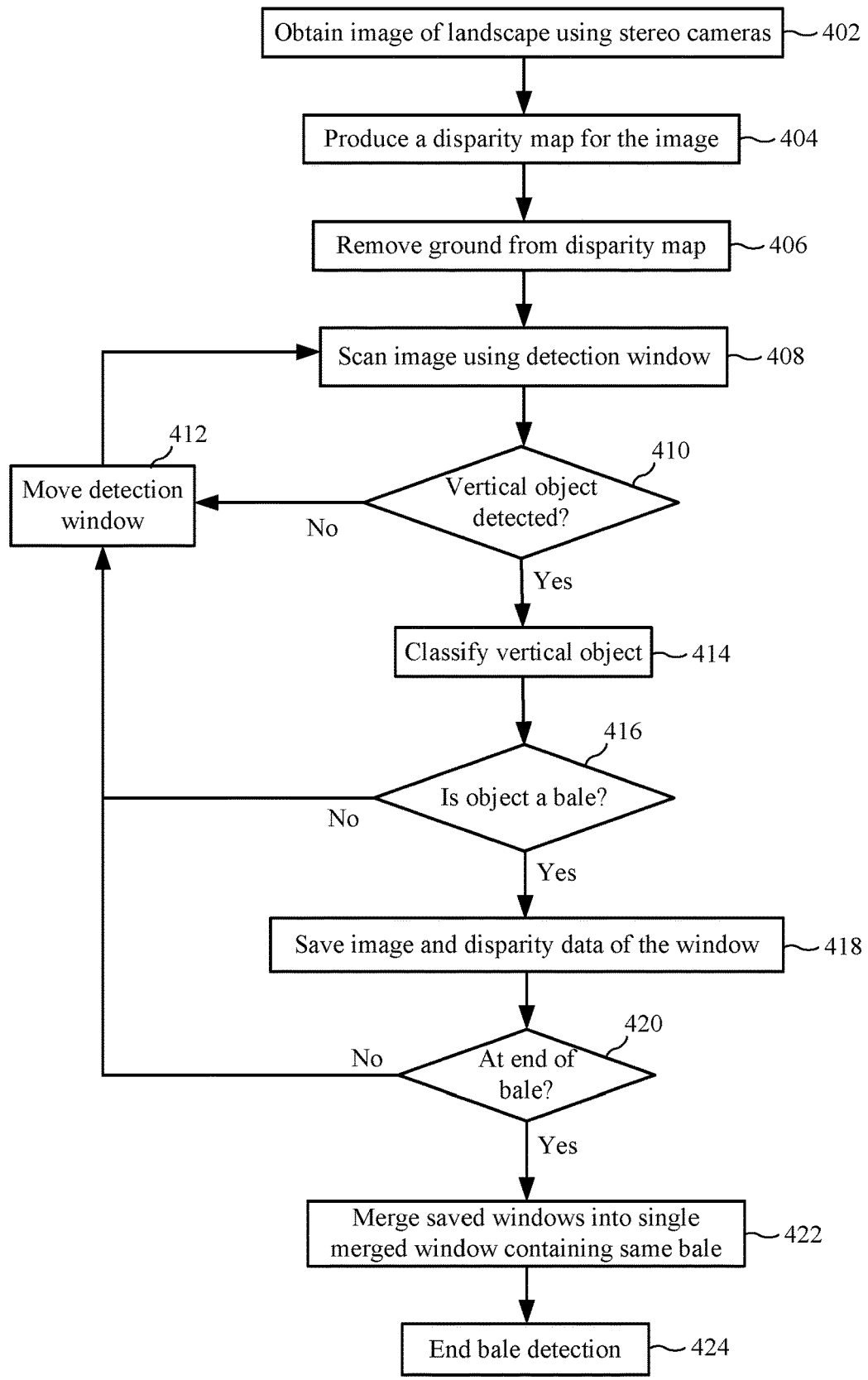
FIG. 4 illustrates a method for detecting a bale of material on the ground using a stereo camera system in accordance with various embodiments.

FIG. 4 illustrates a method for detecting a bale of material on the ground using a stereo camera system in accordance with various embodiments. It is noted that the processes shown in FIG. 4 are implemented for each image produced by the stereo camera system, and that the stereo camera system can produce n image frames per second (e.g., n=5-10). The method of FIG. 4 involves obtaining 402 an image of a landscape using stereo cameras. A disparity map is produced 404 for the image. According to some embodiments, disparity pixels corresponding to the ground in the image are removed 406 from the disparity map. Removing the ground from the disparity map leaves only vertical objects in the landscape, which can significantly increase object detection efficiency.

The method of FIG. 4 further involves scanning the image 408 for a vertical object using a detection window. The detection window has a predetermined size which makes searching for vertical objects more efficient. More particularly, the detection window has a size that corresponds to a size of a bale at a given distance separating a vertical object in the image from the stereo camera system. To accelerate the scanning process, disparity pixels within the detection window are checked to determine if a vertical object is contained within the detection window. A vertical threshold relative to the ground can be established to ignore vertical objects close to the ground that would not be a bale. For example, a typical round bale is 5 feet wide and 6 feet tall. A vertical threshold of 3 feet, for example, can be established, such that only vertical objects greater than the vertical threshold are analyzed. Disparity values for pixels of a vertical object will be noticeably larger than disparity values of pixels for the background (e.g., the sky), which will have little variation in disparity values. A threshold can be empirically determined (e.g., an n pixel shift) for a given vision system arrangement to distinguish disparity pixel values for vertical objects from disparity pixel values of the background.

The disparity pixels of the detection window can be quickly analyzed to determine 410 if any disparity pixels have values that exceeds a threshold indicative of a vertical object. If a vertical object is not detected in the detection window, the detection window 413 is moved to a new location within the image and the vertical object detection and classification processes 408-410 are repeated. If a vertical object is detected in the detection window, the vertical object is considered a bale observation which requires additional processing to determine if it is an actual bale. The vertical object detected in the detection window is subject to classification 414 in order to determine 416 if the vertical object is an actual bale. If the vertical object is not classified as a bale, the detection window 412 is moved to a new location of the image and the vertical object detection and classification processes 408-416 are repeated.

If the vertical object is classified as a bale, the image and disparity data of the detection window is saved 418. Because the detection window may only capture a portion of the vertical object indicative of a bale, a check is made 420 to determine if the end of the bale has been reached. If not, the detection window is advanced 412 to a new location of the image and the vertical object detection and classification processes 408-416 are repeated. Repeating this process may result in detection of a different portion of the same bale, in which case the image and disparity data of the detection window covering this different portion of the same bale may be saved 418. If not at the end of the bale 420, the detection window is advanced 412 to a new location and the vertical object detection and classification processes 408-420 are repeated. If the end of the bale has been reached 420, all saved detection windows corresponding to the same bale are merged 422 into a single merged window, which concludes 424 the bale detection method shown in FIG. 4. The single merged window can be further processed to estimate the pose of the detected bale.

Figure 5:
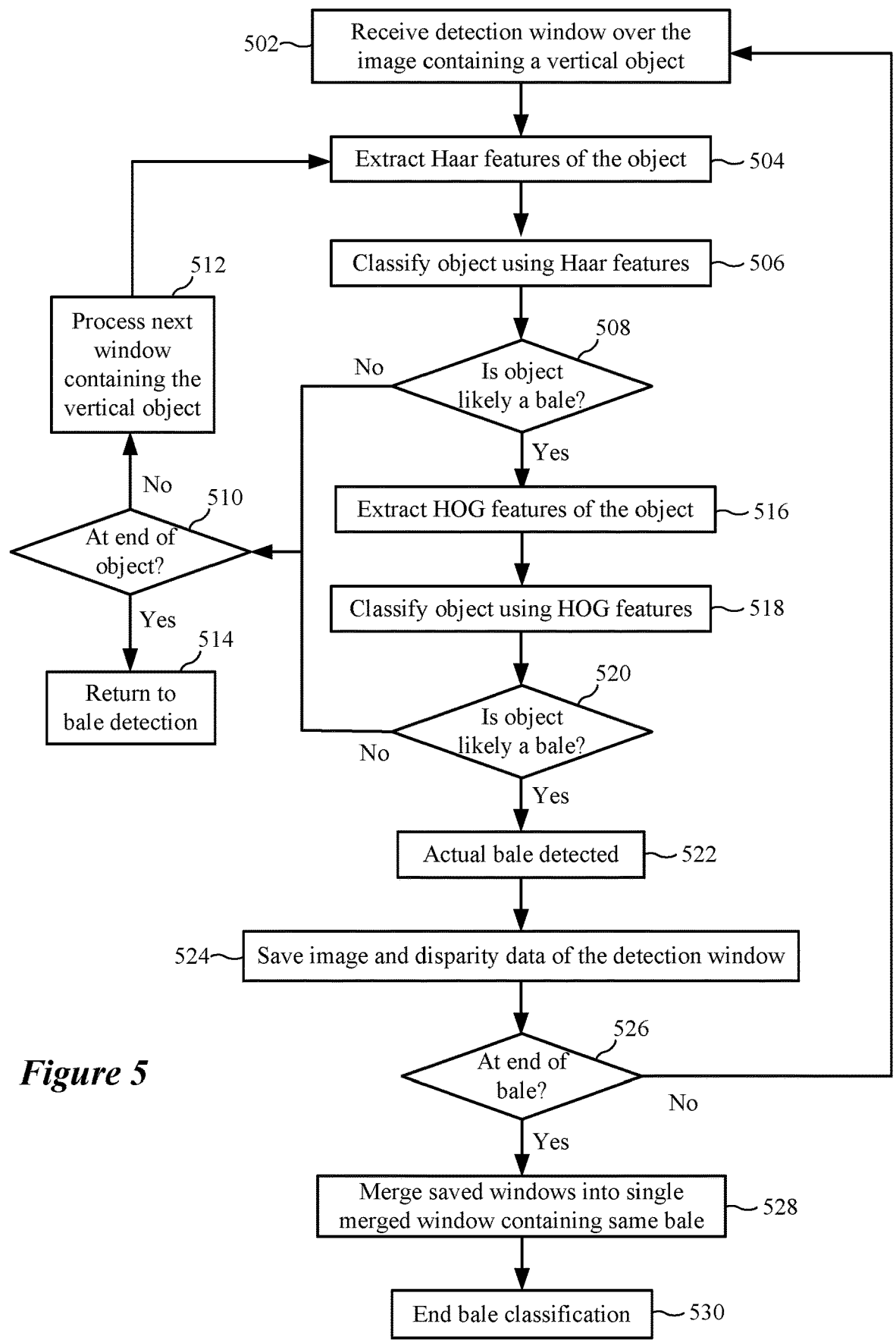
FIG. 5 illustrates additional details of the vertical object detection and classification processes shown in FIG. 4.

FIG. 5 illustrates additional details of the vertical object detection and classification processes 408-422 shown in FIG. 4. It is noted that the processes shown in FIG. 5 are implemented for each image produced by the stereo camera system, and that the stereo camera system can produce n image frames per second (e.g., n=5-10). The method shown in FIG. 5 begins with the assumption that a vertical object has been detected within a detection window and further involves receiving 502 the detection window situated over the image containing the vertical object. The method shown in FIG. 5 involves two stages of vertical object classification that operate on the image. The first stage of object classification involves extraction 504 of Haar features of the vertical object from the image. Given the detection window containing the vertical object, the Haar features are the sums of the pixel intensities between adjacent rectangular sub-windows (rectangular regions) that are used to calculate the difference between these sums. The Haar features have the capability to adjust the evaluation sub-window size and scale factor of the features. Having extracted the Haar features of the vertical object 504, the vertical object is classified 506 using the Haar features.

According to some embodiments, a support vector machine (SVM) can be used to classify the vertical object using the extracted Haar features. The SVM classifier is a binary classifier which looks for an optimal hyperplane as a decision function. The SVM is trained on images containing a particular object, a bale in this case. The SVM classifier makes decisions regarding the presence of the bale using the extracted Haar features. Object classification 506 can produce a first output (e.g., a binary 1) indicating that the vertical object is likely a bale, and a second output (e.g., a binary 0) indicating that the vertical object is not likely a bale.

If the object is not likely a bale 508, a check is made 510 to determine if the end of the vertical object has been reached. If not, the next window containing the vertical object is processed 512, and the extraction and classification steps 504 and 506 are repeated for the next window. If the end of the vertical object has been reached 510, processing returns 514 to bale detection, such as by advancing the detection window to a new location of the image at block 412 of FIG. 4. If it is determined 508 that the vertical object is likely a bale, the second stage of vertical object classification commences.

The second stage of object classification involves extraction 516 of HOG (Histogram of Oriented Gradients) features of the vertical object. A HOG feature extraction method counts the occurrences of gradient orientations in localized portions of the sub-window (rectangular regions) to create a histogram. The HOG feature extraction method has configurable parameters that are defined specifically to the appearance of the object being evaluated that include the cell size, block size, number and position of blocks, number of orientation sub-divisions, and order of Sobel edge extraction subdivisions. Having extracted the HOG features of the vertical object 516, the object is classified 518 using the HOG features. According to some embodiments, an SVM can be used to classify the vertical object using the extracted HOG features. Object classification 518 can produce a first output (e.g., a binary 1) indicating that the vertical object is likely a bale, and a second output (e.g., a binary 0) indicating that the vertical object is not likely a bale.

If it is determined 520 that the vertical object is not likely a bale, a check is made 510 to determine if the end of the vertical object has been reached. If not, the next window containing the vertical object is processed 512, and the extraction and classification steps 504-518 are repeated for the next window. If the end of the vertical object has been reached 510, processing returns 514 to bale detection, such as by advancing the detection window to a new location of the image at block 412 of FIG. 4. If it is determined 520 that the vertical object is likely a bale, then both stages of the two-stage classification process indicate that the vertical object is likely a bale. As such, the vertical object is deemed 522 an actual bale (e.g., an actual bale has been detected). The image and disparity data for the detection window are saved 524.

As was discussed previously, because the detection window may only capture a portion of the vertical object indicative of a bale, a check is made 526 to determine if the end of the bale has been reached. If not, the next detection window covering the same vertical object in the image is received 502 and the processes from blocks 504-526 are repeated. Repeating this process may result in detection of a different portion of the same bale, in which case the image and disparity data of the detection window covering this different portion of the same bale is saved 524. If the end of the bale has been reached 526, all saved detection windows corresponding to the same bale are merged 528 into a single merged window, which concludes 530 the bale detection and classification method shown in FIG. 5. The single merged window can be further processed to estimate the pose of the detected bale.

FIGS. 6A and 6B illustrate a sliding window technique for detecting a bale present in an image in accordance with various embodiments. Referring to FIG. 6A, a sliding window 602 is shown sliding across an image which contains a vertical object, which in this case is a bale 604. As was discussed previously, the detection window 602 has a predetermined size that corresponds to a size of the bale 604 at a given distance separating the bale in the image from the stereo camera system. As such, the size of the detection window 602 is equivalent to that of the bale 604 in the image shown in FIG. 6A (and in FIG. 6B).

In scenario A of FIG. 6A, the sliding detection window 602 is positioned above and to the left of the vertical object 604. A check of the disparity pixel values within the detection window 602 in scenario A reveals that no disparity pixel values exceed the threshold, indicating an absence of a vertical object within the detection window 602. As such, the detection window 602 is advanced to the next location in the image. In this illustrative example, the detection window 602 is advanced along the same row of the image by a distance equivalent to the length of the window 602. It is noted that the distance of detection window advancement can be greater than or less than the length of the detection window 602.

In scenario B of FIG. 6A, the detection window 602 covers a small portion of the vertical object 604. Although the disparity pixel values within the detection window 602 indicate the presence of a vertical object, the object would not be classified as a bale due to insufficient coverage of the detection window 602 over the vertical object 604. The image and disparity data contained within the detection window 602 is discarded, and the detection window 602 is advanced to its next location of the image. In scenario C of FIG. 6A, the detection window 602 again covers an insufficient portion of the vertical object 604, leading to the determination that the vertical object contained within the detection window 602 in scenario C is not a bale. The image and disparity data contained within the detection window 602 is discarded, and the detection window 602 is advanced to the next location of the image along the same row. In scenario D, the detection window 602 has moved completely away from the vertical object 604, leading to the determination that no vertical object is contained within the detection window 602 in scenario D. It can be seen that none of the detection scenarios A-D of FIG. 6A resulted in successful detection of the bale 604.

In FIG. 6B, the detection window 602 has been shifted down the image by one or more rows and is shown advancing toward the same bale 604 shown in FIG. 6A. In scenario E of FIG. 6B, the detection window 602 is positioned slightly above and to the left of the vertical object 604. A check of the disparity pixel values within the detection window 602 in scenario E reveals that no disparity pixel values exceed the threshold, indicating an absence of a vertical object within the detection window 602. The detection window 602 is advanced to its next location in the same row, which is shown in scenario F. In scenario F, the detection window 602 covers nearly all of the vertical object 604.

In scenario F, classification of the vertical object 604 results in a positive detection of a bale 604 within the detection window 602. In general, a positive detection of a vertical object 604 as a bale within a detection window 602 requires a minimum of about 90% coverage of the vertical object 604 by the detection window 602. In scenario F, this minimum 90% coverage threshold has been satisfied. In response to the positive detection, the image and disparity data contained within the detection window 602 are saved. The detection window 602 is advanced to its next location in the same row, which is shown in scenario G.

In scenario G of FIG. 6B, the detection window 602 covers an insufficient portion of the vertical object 604, leading to the determination that the vertical object contained within the detection window 602 in scenario G is not a bale. The image and disparity data contained within the detection window 602 is discarded, and the detection window 602 is advanced to the next location of the image along the same row. In scenario H, the detection window 602 has moved completely away from the vertical object 604, leading to the determination that no vertical object is contained within the detection window 602 in scenario H. It can be seen in FIG. 6B that one of the detection scenarios, scenario F, resulted in successful detection of the bale 604.

Bale Pose Estimation

Figure 7:
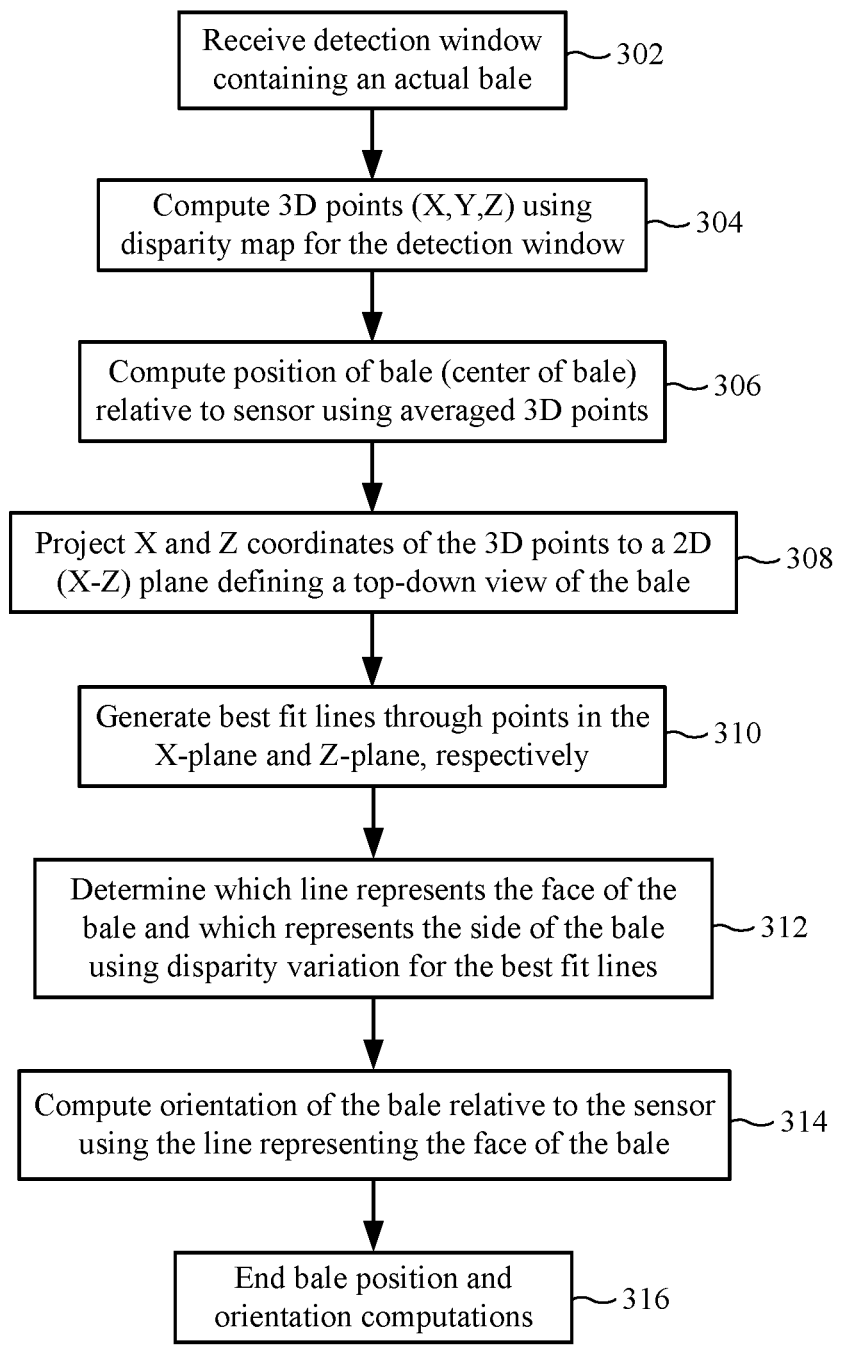
FIG. 7 illustrates a method of estimating bale pose in accordance with various embodiments.

FIG. 7 illustrates a method of estimating bale pose in accordance with various embodiments. In discussing the method shown in FIG. 7, reference will be made to FIGS.

8A, 8B, and 9. The bale pose estimation method begins with receiving 302 a detection window containing an actual bale. The actual bale detection window can be the merged detection window described in block 520 of FIG. 5 and block 422 of FIG. 4, for example. It is noted that the processes shown in FIG. 7 are implemented for each detection window that contains a bale.

The method shown in FIG. 7 involves computing 304 3-D points (X, Y, Z) using the disparity map for the detection window. According to some embodiments, the OpenCV function ReprojectImageTo3D and associated arguments can be used to generate a 3-D point cloud from the disparity map. The method also involves computing 306 the position of the bale relative to the sensor using averaged 3-D points. The averaged 3-D points provide a position of the center of the bale. The method further involves projecting 308 X and Z coordinates of the 3-D points to a 2-D (X-Z) plane defining a top-down view of the bale. The method also involves generating 310 best fit lines through the points in the X-plane and the Z-plane, respectively (see, e.g., FIG. 9). The method further involves determining 312 which line represents the face of the bale (see face 122-$f$ in FIG. 8A) and which line represents the side of the bale (see side 122-$s$ in FIG. 8A) using disparity variation for the best fit lines.

Disparity values for pixels representing the face 122-$f$ of the bale 122 differ significantly from the disparity values for pixels representing the side 122-$s$ of the bale 122. The face 122-$f$ of the bale 122 is essentially a circular cross-section along a single plane, with relatively little variation in depth along the plane (with some variation due to the baled material). Hence, the disparity values for pixels representing the face 122-$f$ of the bale 122 are relatively consistent (e.g., a small variance). In contrast, the side 122-$s$ of the bale 122 is a curved cylindrical structure whose depth varies significantly between the top of the bale 122 and the bottom of the bale 122 (e.g., a large variance). As such, the disparity values for pixels representing the side 122-$s$ of the bale 122 vary significantly along multiple planes that define the curvature of the cylindrical structure. This unique disparity signature of a round bale is used to determine the orientation of the bale relative to the stereo camera system (sensor). The method involves computing 314 the orientation of the bale relative to the sensor using the line representing the face 122-$f$ of the bale 122, which concludes 316 the bale pose computations of FIG. 7.

Figure 8A:
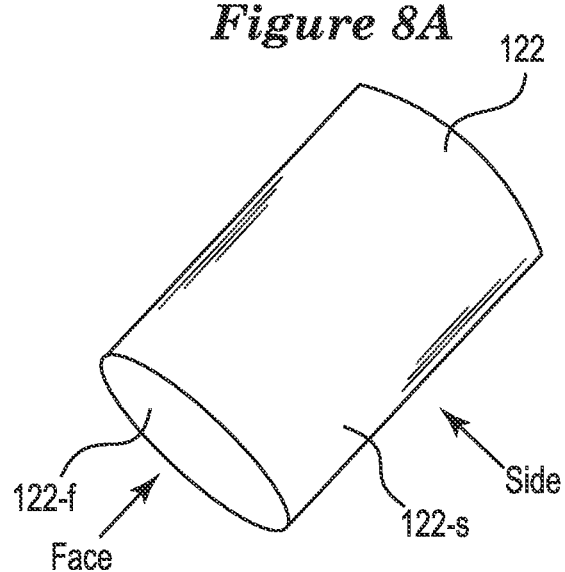
FIG. 8A illustrates a representative bale of material having a cylindrical side and circular faces which are subject to detection and mapping using a stereo camera system in accordance with various embodiments.
Figure 8B:
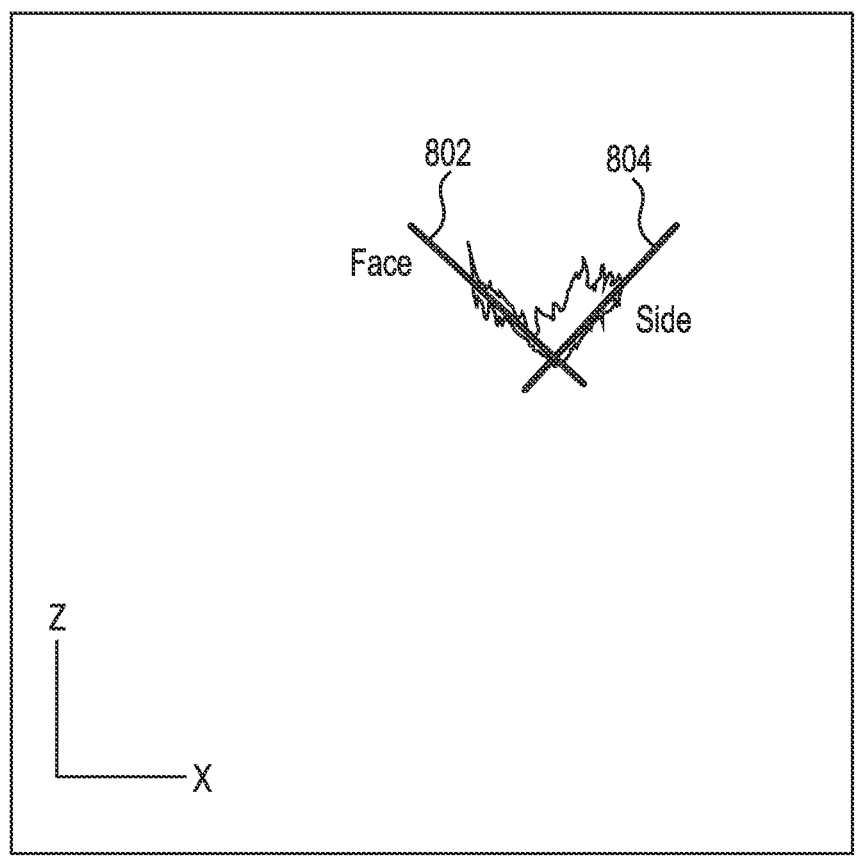
FIG. 8B shows results of determining which line represents the face of the bale and which line represents the side of the bale using disparity variation for the best fit lines in accordance with various embodiments.

FIG. 8B illustrates pose estimation data acquired by the stereo camera system after detecting an actual bale 122, such as that shown in FIG. 8A. As can be seen in FIG. 8B, a line 802 corresponding to the face 122-$f$ of the bale 122 is drawn through points corresponding to the surface of the generally flat bale face 122-$f$. A line 804 corresponding to the side 122-S of the bale 122 is drawn through points corresponding to the surface of the cylindrical body of the bale 122. The two lines 802 and 804 are orthogonal to one another, forming an L-shaped signature. As can be seen in FIG. 8B, the points in the region of the bale face 122-$f$ have a relatively small variance (e.g., width of the white area) relative to the points in the region of the bale side 122-$s$. The surface of the bale 122 having the smallest variance in disparity pixel values is considered to be the face 122-$f$ of the bale 122. The surface of the bale 122 with the largest variance in disparity pixel values is considered to be the side 122-$s$ of the bale 122. Distinguishing the face 122-$f$ from the side 122-$s$ of the bale 122 is important for purposes of aligning an autonomous bale mover with a detected bale in order to pick up the bale.

According to some embodiments, the perception unit of the autonomous bale mover looks out about 30 m from the cameras to detect a bale and determine the position of the bale. The pose estimation operates more effectively when closer to the bale. As such, pose estimation is initiated several meters closer to the bale following bale detection. For example, pose estimation can be initiated within about 20 m of the bale subsequent to detecting the bale at about 30 m. The distances for detecting bales and performing pose estimations are configurable, but are generally constrained based on the camera resolution and field of view. It is understood that different cameras can estimate bale pose (and detect bales) at different distances, such as further away than 20 m or 30 m, for example.

Bale Mapping

Figure 10:
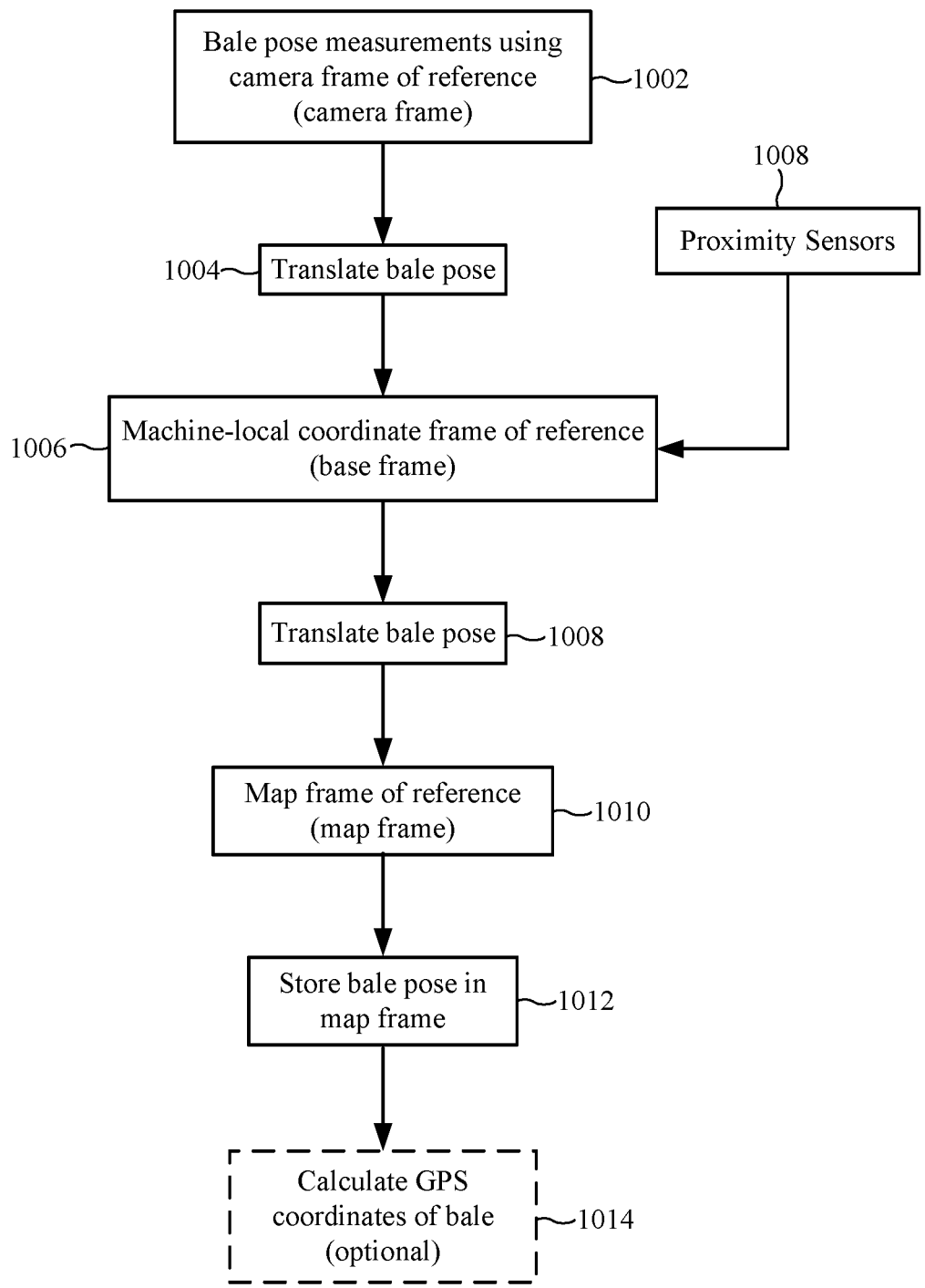
FIG. 10 illustrates a method for mapping bales detected by the stereo camera system in a mapping module in accordance with various embodiments.

FIG. 10 illustrates a method for mapping bales detected by the stereo camera system in a mapping module in accordance with various embodiments. Bale mapping assumes that a sensor system comprising the stereo camera system is mounted on an autonomous bale mover (or other moving platform). Mapping of bales involves transposition of bale poses from one frame of reference to another. More specifically, the stereo camera system has its own frame of reference, referred to as a camera frame, since the camera system can move relative to the center of the autonomous bale mover. The autonomous bale mover has its own frame of reference, referred to as a base frame, and the mapping module (see mapping module 108 in FIGS. 1 and 2) has its own frame of reference, referred to as a map frame. Storing bale poses in the map frame allows the location of bales to be known irrespective of the location of the bale mover.

According to various embodiments, the camera, base, and map frames are defined using a Cartesian coordinate system. It is noted, however, that the camera frame is atypical relative to the base frame and the map frame. For the base frame and the map frame, the Z-axis denotes elevation above (or below) the horizontal X-Y plane. For the camera frame, however, image analysis software addresses the pixels of an image as X and Y, and when that image is used to produce 3-D data, the remaining "distance away" axis is the Z-axis. As such, the horizontal plane when referring to pixel analysis is the X-Z plane, while in the base and map frames the horizontal plane is the X-Y plane. In some embodiments, the global position of the bales can be computed, such as by use of a GPS, and stored in the mapping module. It is noted that the global position of the bales is defined in terms of a polar coordinate system.

FIG. 10 shows a method of translating bale poses between different frames of reference in accordance with various embodiments. Bale pose measurements are made 1002 by the stereo camera system using the camera frame of reference. Using known techniques, the bale pose measurements are translated 1004 from the camera frame to the base frame of the autonomous bale mover 1006. The bale pose measurements are then translated 1008 from the base frame to the map frame 1010 supported by the mapping module. The bale poses are stored in the mapping module using the map frame of reference. As was discussed previously, the GPS coordinates of the bale can be optionally calculated 1014 and stored in the mapping module. The location of objects detected by the proximity sensor 1008 can be stored using the base frame of reference 1006 (or optionally in the map frame of reference).

The mapping module, also referred to herein as a world model, stores all bale poses in the map frame of reference. The world model is a container for all of the information about the local environment, such as the ground, objects, navigation information, bale pose, timestamps for the bale poses, etc. The world model operates independently of the stereo camera system and can handle data at different frame rates from different sources. As the autonomous bale mover moves around a field, for example, bale poses are updated automatically and continuously by the world model. As such, the bale poses are refined over time as new camera data is received (e.g., from different angles). Inputs (e.g., cameras, laser scanners) are processed continuously and fed into the world-model, which continuously aggregates all of the received information and provides increasingly accurate information about the location of bales to the rest of the system. All bale detections fed into the world model are accompanied by a confidence value, and detections with higher confidences "out-weigh" detections with lower confidences.

According to some embodiments, the world model operates in two dimensions (X and Z) rather than three dimensions. The world model assigns an error factor (e.g., a confidence factor) to a bale pose based on camera covariance in the X-Z positions, which results in an ellipse of uncertainty. This ellipse of uncertainty shrinks as more pose measurements are received for a particular bale. The world model can test the validity of received bale poses against the ellipse and reject poses that are outside of the ellipse (e.g., >2 standard deviations). A received bale pose that falls within the ellipse is used to refine the bale pose.

Figure 11:
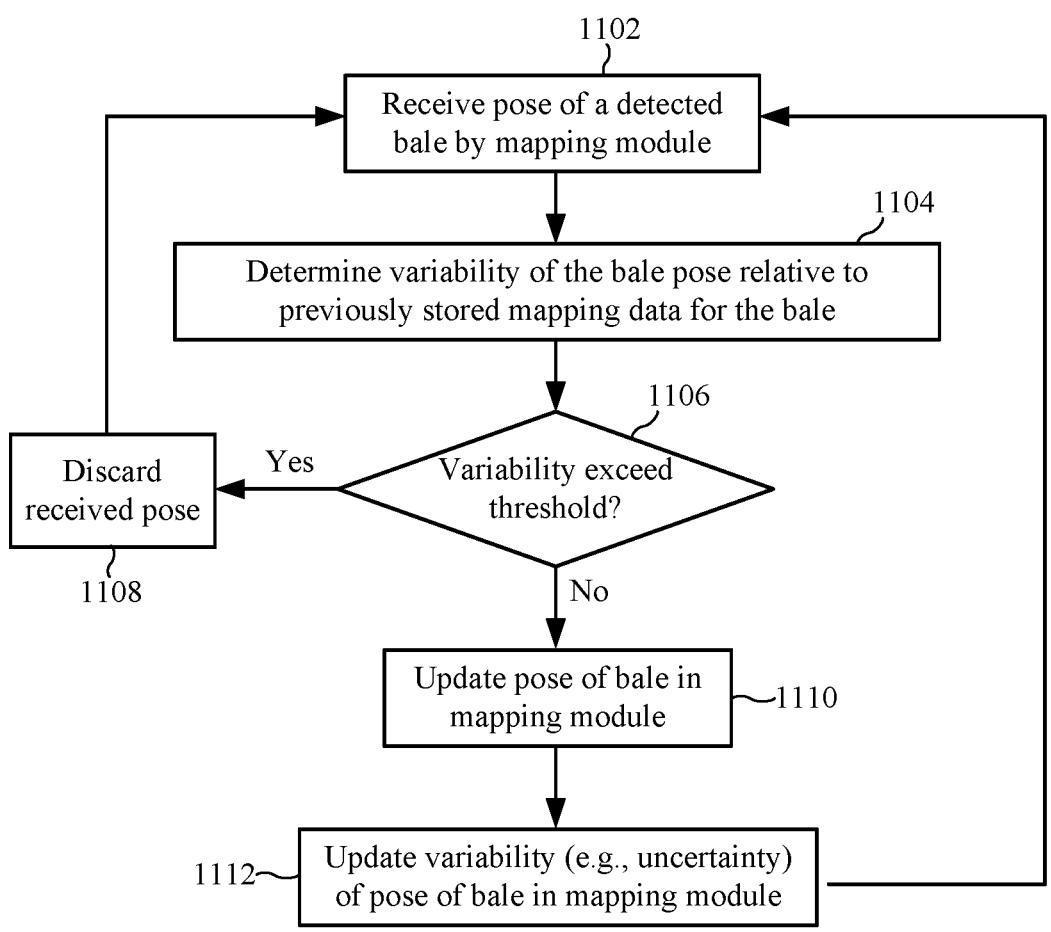
FIG. 11 illustrates a method for updating the mapping module (e.g., world model) in accordance with various embodiments.

FIG. 11 illustrates a method for updating the mapping module (e.g., world model) in accordance with various embodiments. The method shown in FIG. 11 involves receiving 1002 the pose of a detected bale by the mapping module 108. Instead of simply incorporating the received bale pose into the map frame supported by the mapping module, a check is made to determine the validity of the received bale pose. For example, the variability of the received bale pose relative to previously stored mapping data for the bale can be determined 1104 (e.g., using the ellipse of uncertainty). If the variability exceeds a threshold 1106, the received poses discarded 1108. If the variability does not exceed the threshold 1106, the pose of the bale is updated 1110 in the mapping module. The variability (e.g., uncertainty ellipse) of the bale poses is updated 1112 in the mapping module.

Autonomous Bale Mover

Figure 12:
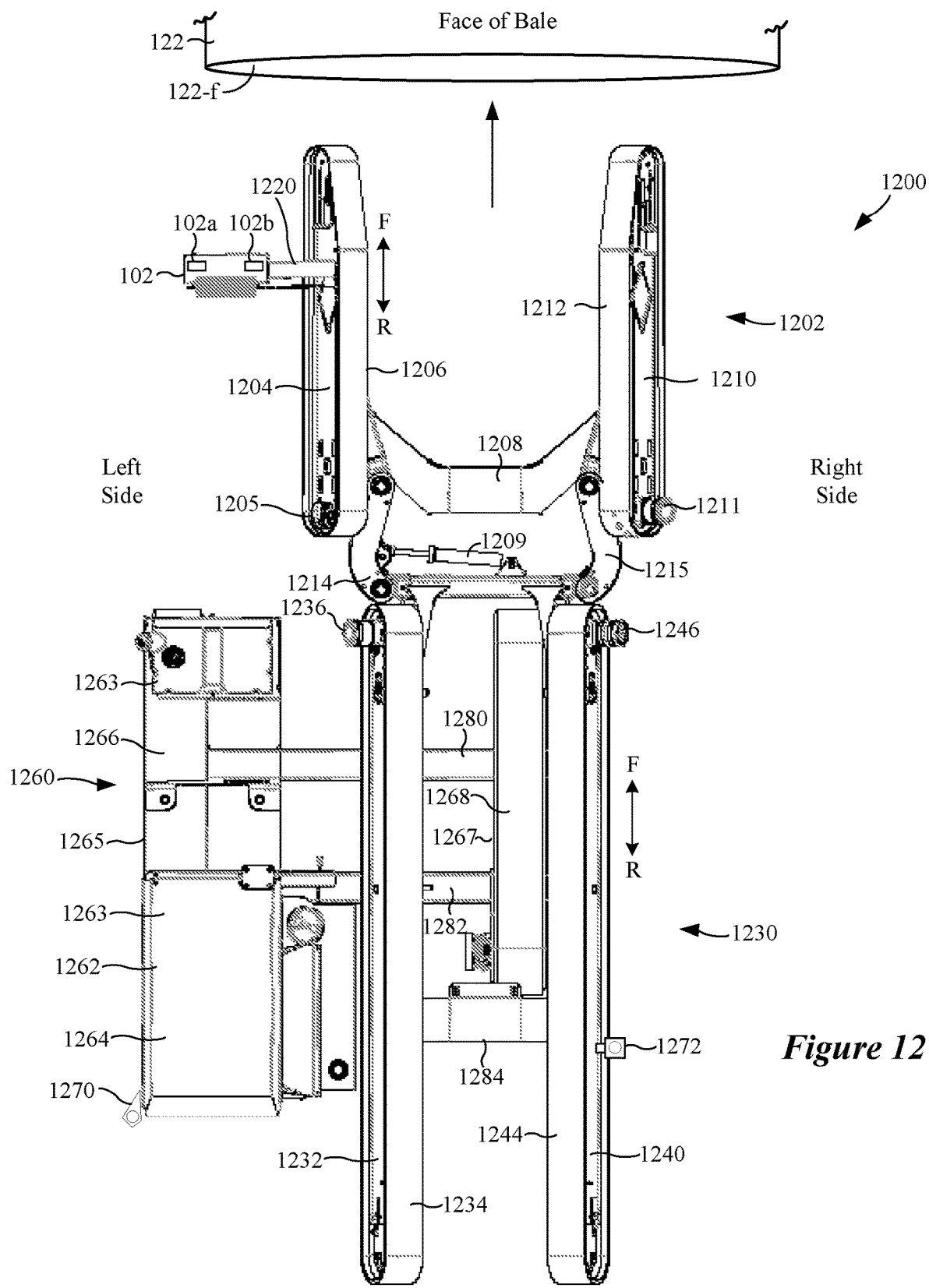
FIGS. 12-18 are different views of an autonomous bale mover in accordance with various embodiments.
Figure 13:
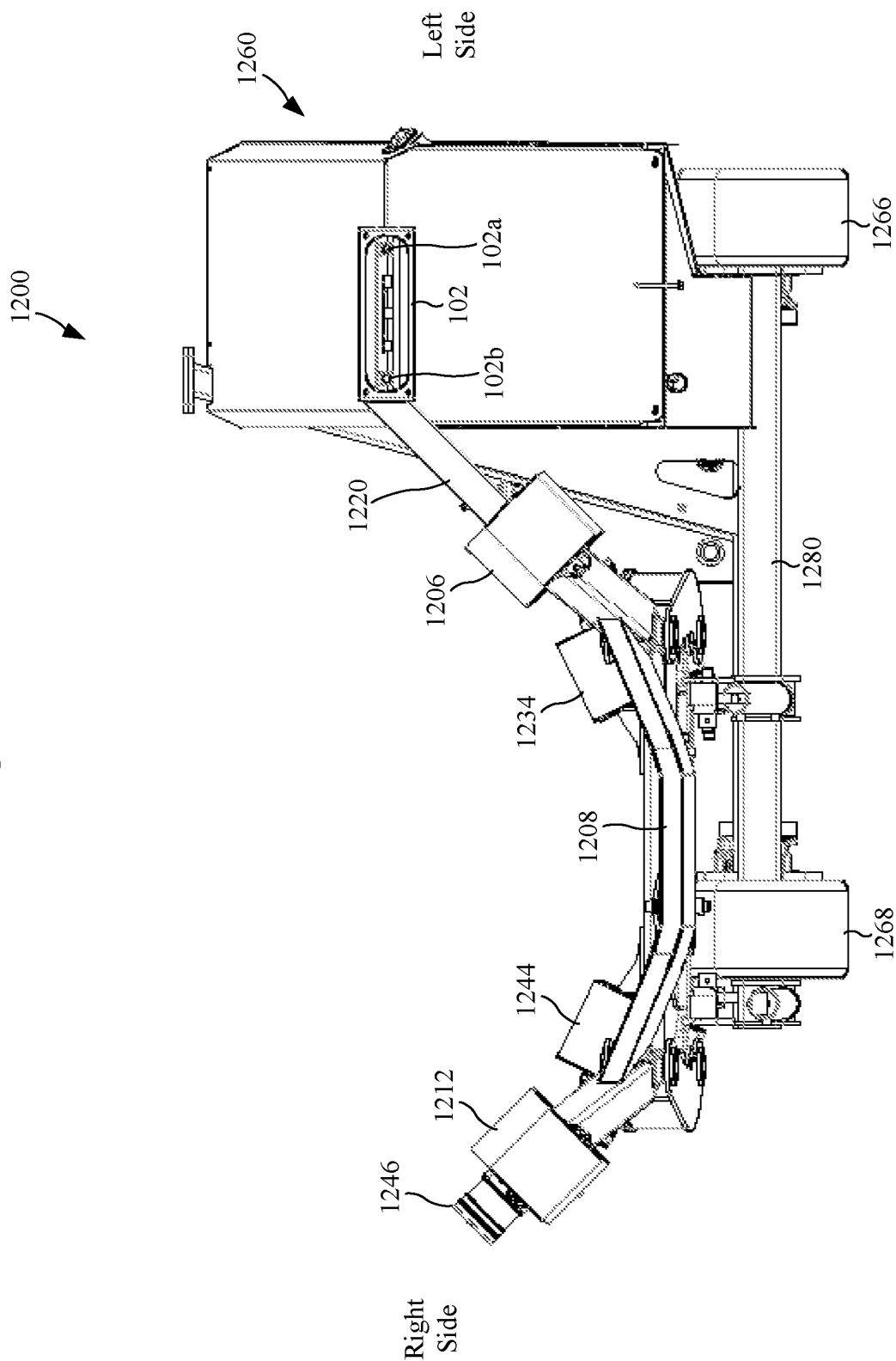
Figure 14:
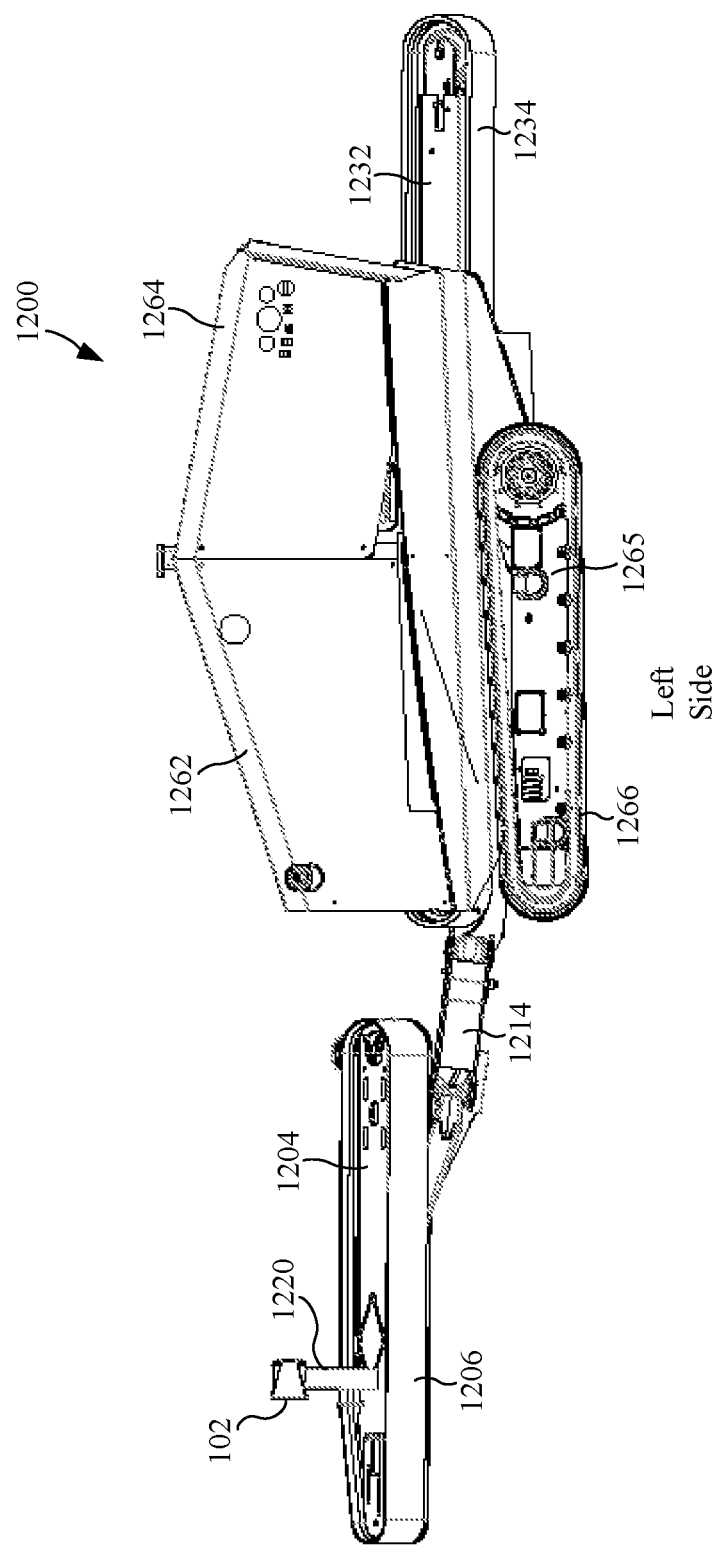
Figure 15:
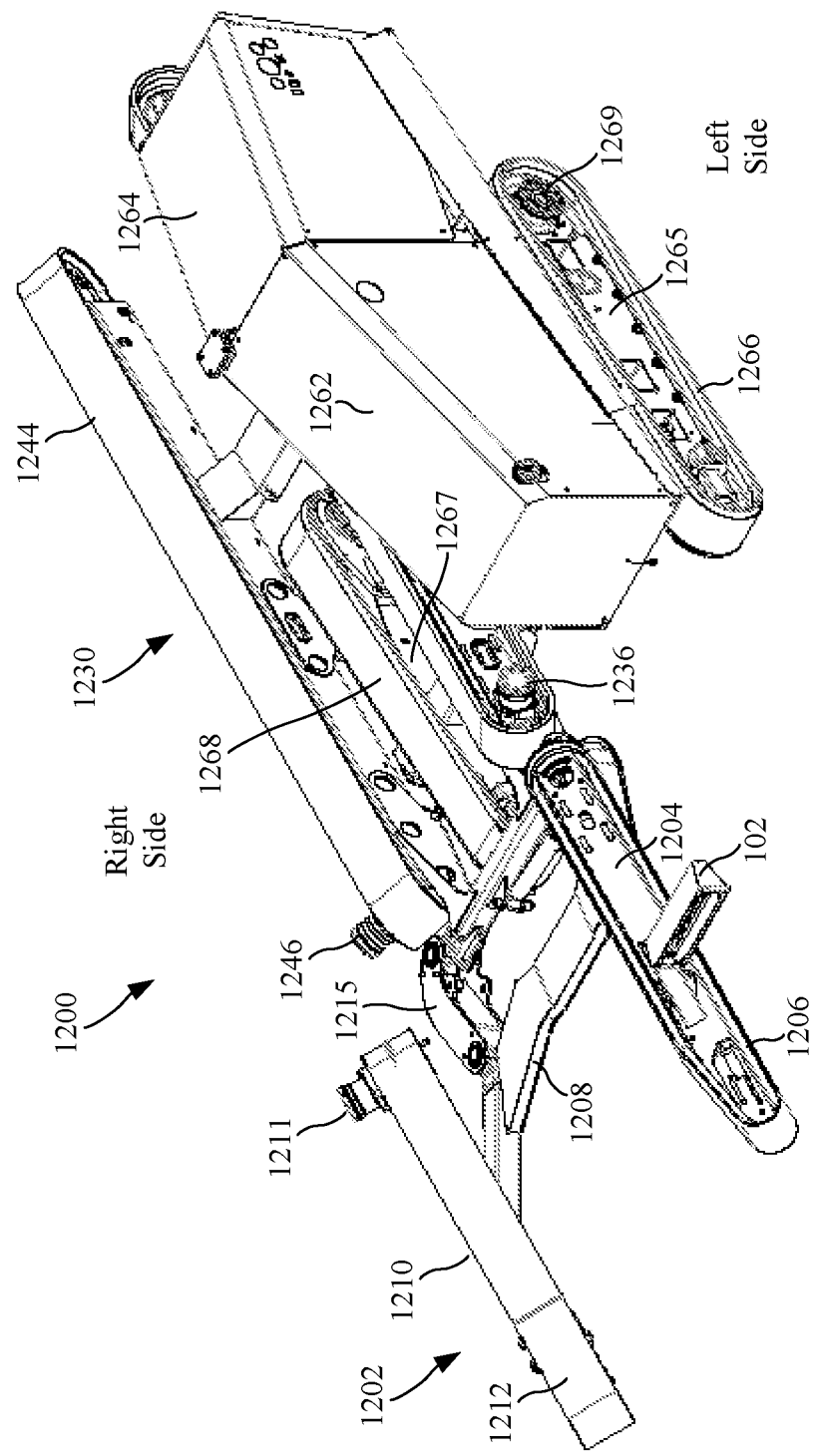
Figure 16:
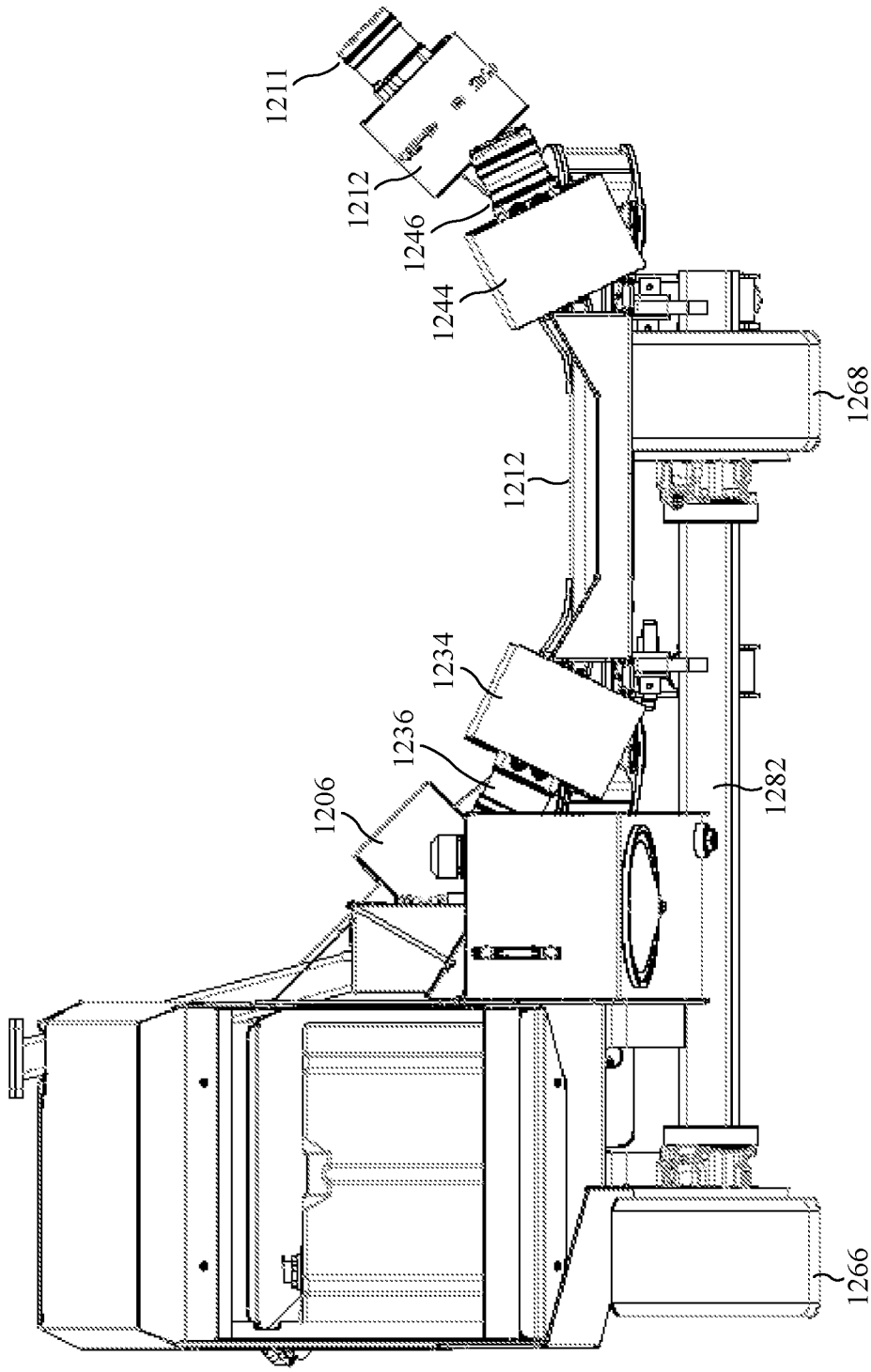
Figure 17:
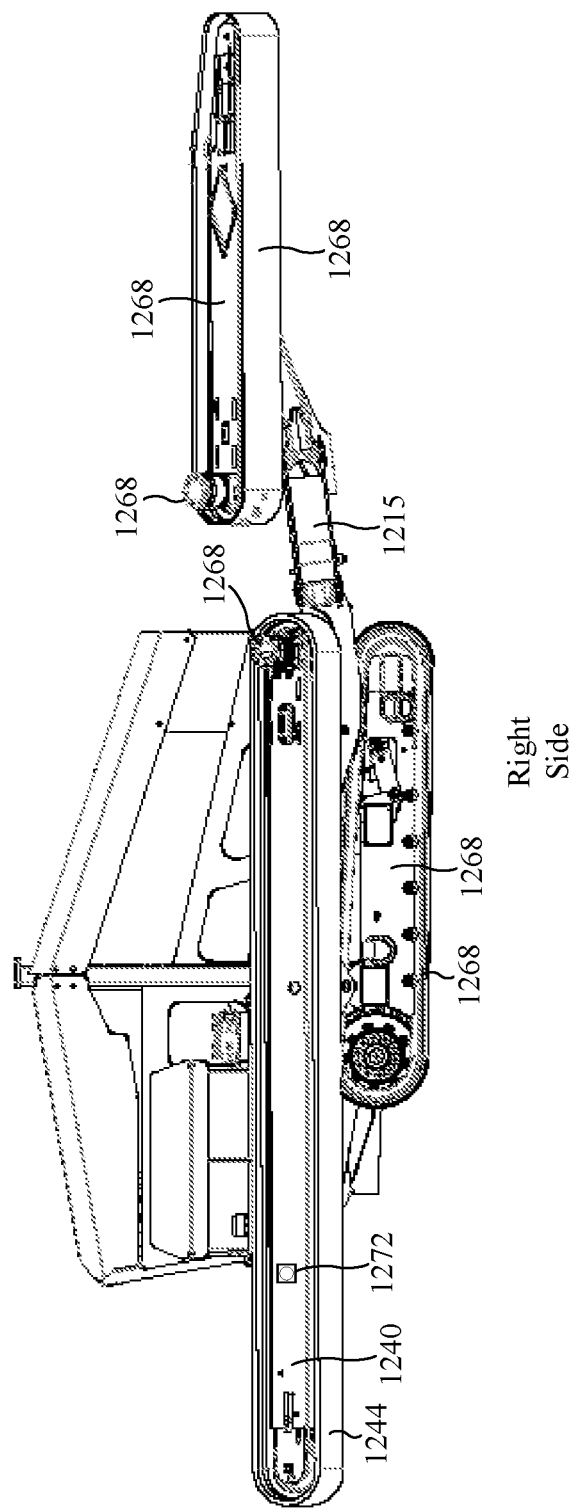
Figure 18:
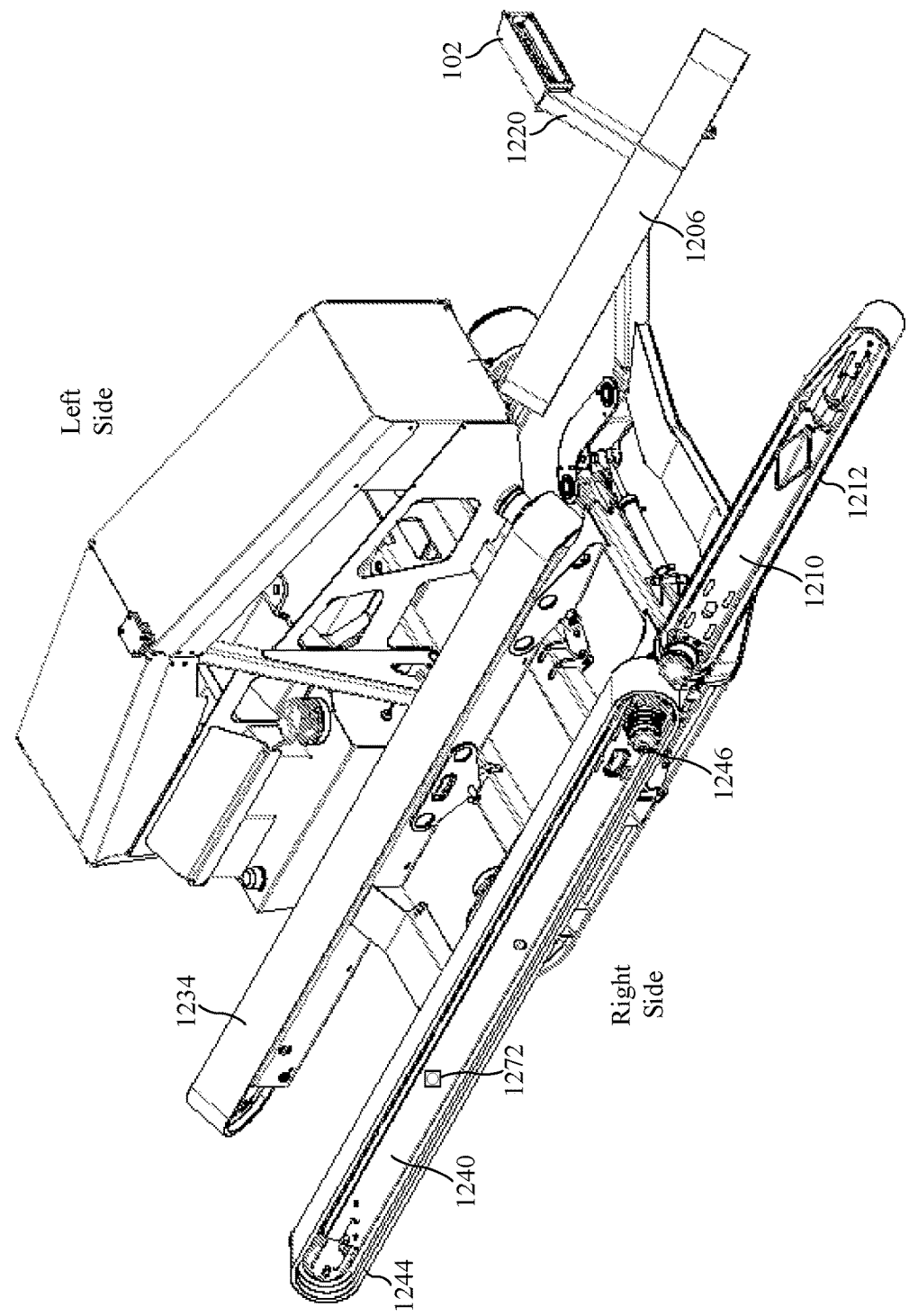

FIGS. 12-18 are different views of an autonomous bale mover 1200 in accordance with various embodiments. FIG. 12 is a top isometric view of the bale mover 1200. FIG. 13 is a front view of the bale mover 1200. FIG. 14 is a left view of the bale mover 1200. FIG. 15 is a left-front isometric view of the bale mover 1200. FIG. 16 is a rear view of the bale mover 1200. FIG. 17 is a right view of the bale mover 1200. FIG. 18 is a right-front isometric view of the baler 1200.

The bale mover 1200 includes a bale loading system 1202, a bale carrying system 1230, and a ground-drive section 1260. The bale loading system 1200 is illustrated coming into contact with a bale 122. The bale loading system 1200 is configured to lift bales from the ground and to place them onto the bale carrying system 1230. The bale carrying system 1230 comprises a conveyor system that defines a longitudinal carrying axis. The conveyor system is configured to hold a plurality of bales aligned end-to-end (face-to-face). As was discussed previously, bale pose estimation and mapping is executed on a continuous basis to identify the face 122-$f$ of the bale 122 and to align the bale mover 1200 (e.g., the bale loading system 1200) with respect to the face 122-$f$ of the bale 122 as the bale mover 1200 approaches the bale 122.

The bale loading system 1202 includes a conveyor system comprising a left bale loading arm 1204 and a right bale loading arm 1210. A brace 1208 is disposed between, and maintains positional stability of, the left and right bale loading arms 1204 and 1210. The right bale loading arm 1210 supports a right conveyor track 1212, which is configured to move relative to the periphery of the right bale loading arm 1210. The right track 1212 is driven by a right motor 1211, such as a hydraulic motor. The left bale loading arm 1204 supports a left conveyor track 1206, which is configured to move relative to the periphery of the left bale loading arm 1204. The left track 1206 is driven by a left motor 1205, such as a hydraulic motor. Extending from the left bale loading arm 1204 is a sensor support 1220. When loading bales, the left and right tracks 1206 and 1207 move in a rearward (R) direction. When unloading bales, the left and right tracks 1206 and 1207 move in a forward (F) direction. The sensor support 1220 is connected to and provides support for a sensor 102. The sensor 102, as discussed previously, includes a stereo camera system comprising a left camera 102$a$ and a right camera 102$b$.

The bale loading system 1202 is connected to the bale carrying system 1230 by left and right coupling arms 1214 and 1215. A bed tilt cylinder 1209 is coupled to the front frame of the bale carrying system 1230 and to the left coupling arm 1214. Actuation of the bed tilt cylinder 1209 raises and lowers the bale loading system 1202 relative to the ground. During transport of the autonomous bale mover 1200, for example, the bale loading system 1202 is typically in the raised state. As the bale loading arms 1204 and 1210 advanced to, and make contact with, a bale 122, the bale loading system 1202 transitions from the raised state to the lowered state. After picking up a bale 122, the bale loading system 1202 moves to the raised state, and the bale mover 1200 searches for a new bale to pick up (or transports the bales to a bale stacking location). When in the raised state, the bale loading system 1202 conveys the picked-up bale rearwardly towards the bale carrying system 1230.

The bale carrying system 1230 includes a conveyor system comprising a left conveyor arm 1232 and a right conveyor arm 1240. The bale carrying system 1230 is designed to hold a predetermined number of bales aligned end-to-end (e.g., 3, 4, 5, 6, 7, 8 or 9 bales) received from the bale loading system 1202. A brace 1284 is connected to, and positionally stabilizes, the left and right conveyor arms 1232 and 1240. The left conveyor arm 1232 supports a left track 1234, which is configured to move relative to the periphery of the left conveyor arm 1232. The left track 1234 is driven by a left motor 1236, such as a hydraulic motor. The right conveyor arm 1240 supports a right track 1244, which is configured to move relative to the periphery of the right conveyor arm 1240. The right track 1244 is driven by a right motor 1246, such as a hydraulic motor. When loading bales, the left and right tracks 1234 and 1244 move in a rearward (R) direction. When unloading bales, the left and right tracks 1234 and 1244 move in a forward (F) direction.

Figure 23:
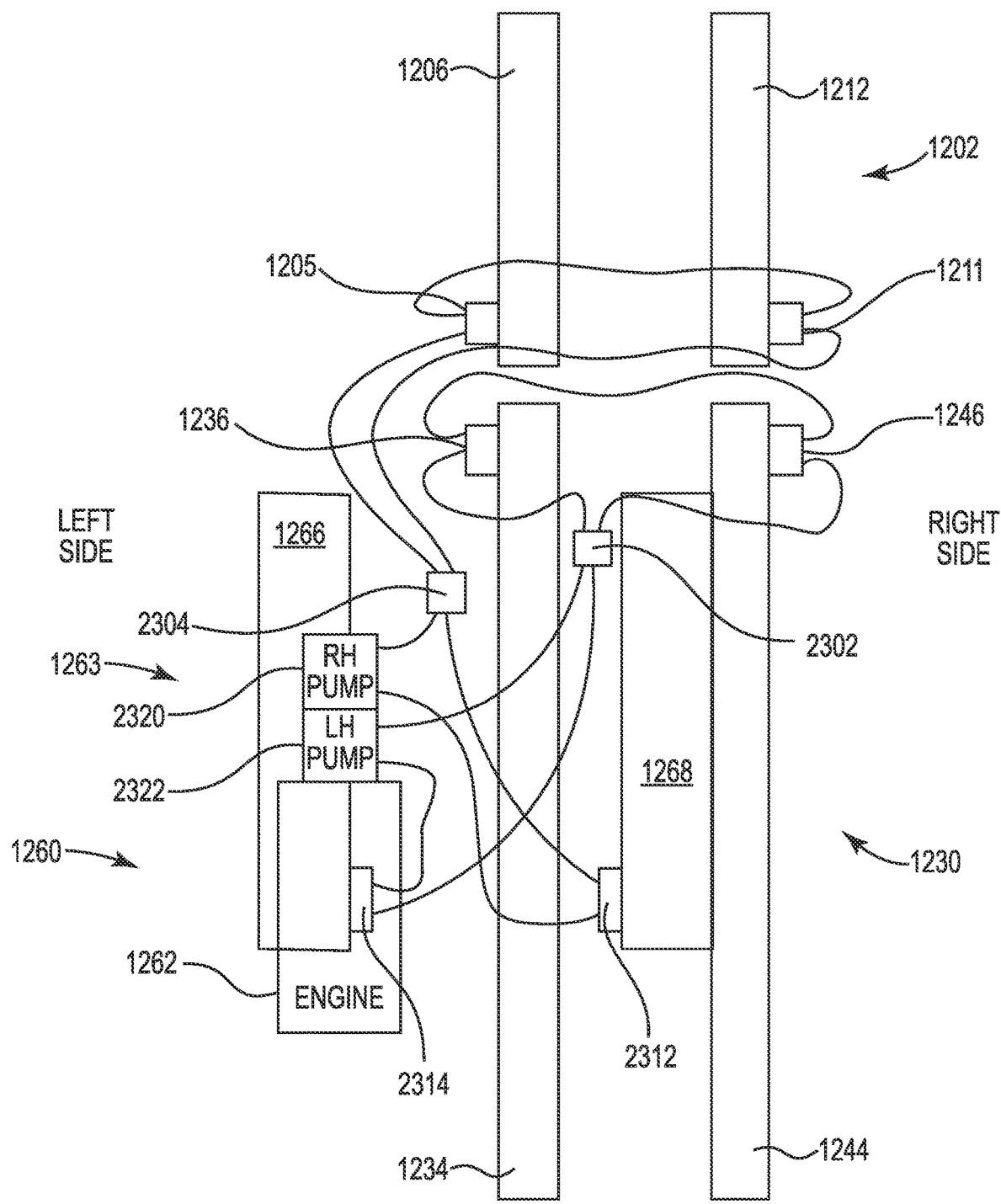
FIG. 23 illustrates a hydraulic system for an autonomous bale mover in accordance with various embodiments.

The ground-drive section 1260 includes a power system, which includes an engine section 1262, a hydraulics system 1263, and an electronics section 1264. The engine section 1262 houses an engine fluidically connected to a fuel tank 1263 and a cooling system. The hydraulic system 1263 includes hydraulic pumps connected to the various hydraulic motors of the bale mover 1200. Details of the hydraulic system 1263 are shown in FIGS. 23 and 24. The ground-drive section 1260 is laterally offset from the bale carrying system 1230, as is discussed hereinbelow. The ground-drive section 1260 includes a left track drive 1265 and a right track drive 1267. The left track drive 1265 includes a left track 1266 movable via a left motor (see, e.g., left hydraulic motor 2314 shown in FIG. 23), and the right track drive 1267 includes a right track 1268 movable via a right motor (see, e.g., right hydraulic motor 2312 shown in FIG. 23). The ground-drive section 1260 is controlled by the electronics section 1264 to propel the autonomous bale mover 1200 along the ground via the left and right track drives 1265 and 1267.

According to various embodiments, the autonomous bale mover 1200 includes a first proximity sensor 1270 and a second proximity sensor 1272, the combination of which provides about 360° of proximity detection around the bale mover 1200 (see, e.g., proximity sensors 114a and 114b in FIG. 3 and accompanying text). According to some embodiments, the first and second proximity sensors 1270 and 1272 are LIDAR sensors, such as laser scanners (e.g., 2-D laser scanners). A representative laser scanner is model LMS1XX (e.g., LMS111-10100) manufactured by SICK Vertriebs-GmbH.

Referring to FIGS. 12 and 13, it can be seen that the center of the ground-drive section 1260 is offset laterally from the center of the bale carrying system 1230 and that of the bale loading system 1202. More particularly, the center of separation between the left and right track drives 1265 and 1267 is offset from the center of separation between the left and right conveyor arms 1232 and 1240 (and the left and right bale loading arms 1204 and 1210). As can be seen in FIGS. 12 and 13, the left track drive 1265 is positioned adjacent and below the power system of the bale mover (engine 1262, hydraulic system 1263, cooling system). The right track drive 1267 is positioned adjacent the longitudinal carrying axis of the bale carrying system 1230. As shown, the right track drive 1267 is positioned between the left and right conveyor arms 1232 and 1240, and biased toward the right conveyor arm 1240.

It was determined after experimentation, that the location of the track drives 1265 and 1267 as shown in FIGS. 12 and 13 allows the center of gravity to always be approximately over the drive tracks 1265 and 1267 irrespective of the load. It is noted that earlier-developed drive track arrangements suffered from not having enough weight on the drive tracks 1265 and 1267 for sufficient traction between loaded and unloaded states. As a result of trial and error, it was found that the "side delivery" configuration (engine section located to the side of the bale loading and conveying sections) provides a consistent center of gravity over the drive tracks 1265 and 1267 irrespective of the load on the bale loading system 1202 and/or bale carrying system 1230. This "side delivery" configuration also uses the engine L to R to counterbalance when the bale mover is loaded with bales with a relatively higher center of gravity.

Bale Mover Control System

Figure 19:
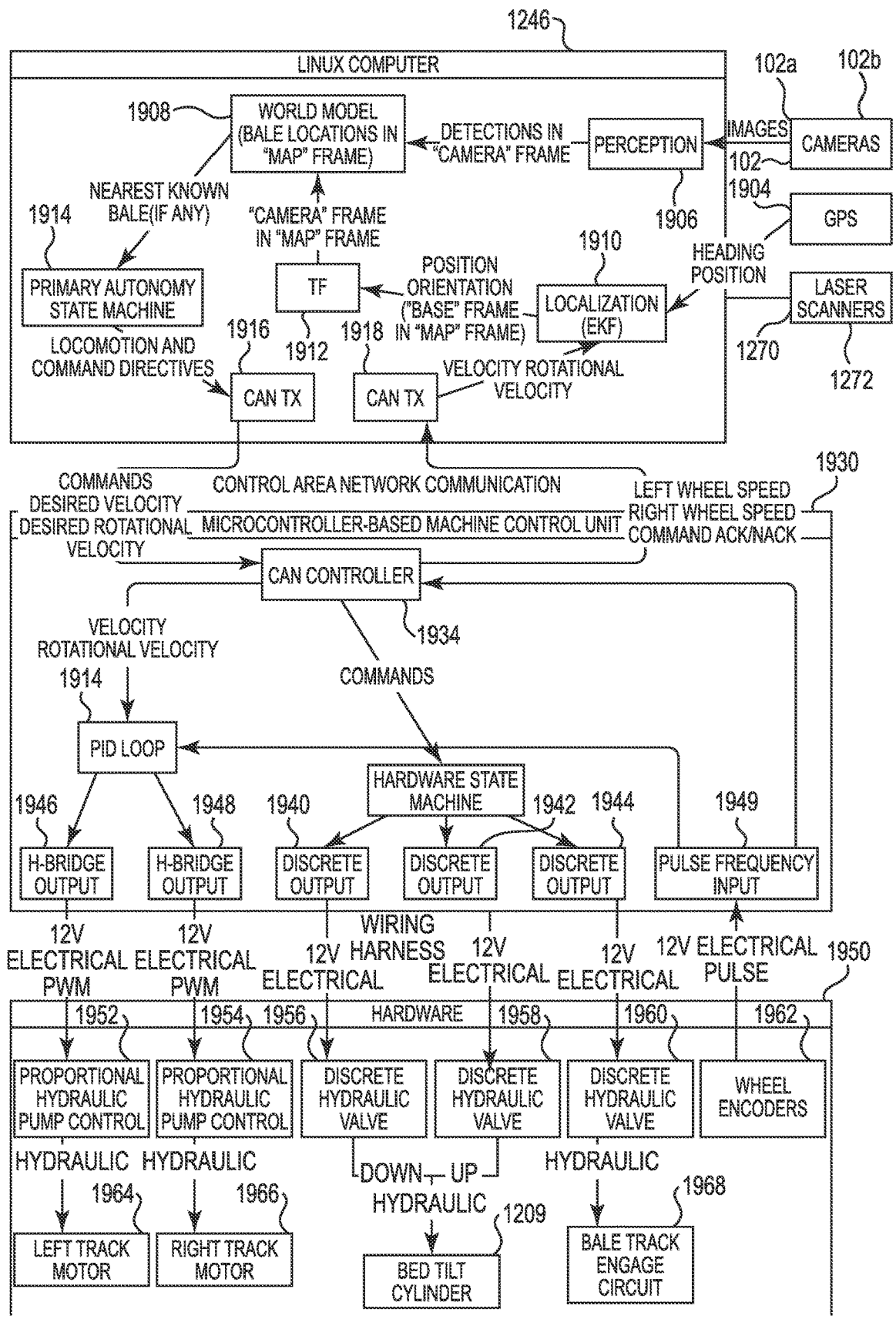
FIG. 19 is a block diagram of a control system for controlling an autonomous bale mover in accordance with various embodiments.

FIG. 19 is a block diagram of a control system for controlling an autonomous bale mover in accordance with various embodiments. The control system shown in FIG. 19 can be implemented to control the autonomous bale mover shown in FIGS. 12-18, for example. The control system shown in FIG. 19 includes a main computer 1246, a microcontroller-based machine control unit 1930, and various hardware 1950. The main computer 1246, which may be a Linux computer, is coupled to a number of sensors that are mounted on the bale mover. These sensors include the stereo camera system sensor 102 (comprising a left camera 102a and a right camera 102b), a GPS 1904, and a pair of laser scanners 1270 and 1272. The cameras 102a and 102b are coupled to a perception module 1906. The perception module 1906 implements the various algorithms that are involved in bale detection, bale classification, and bale pose estimation. The output of the perception module 1906 is bale detections, specific to individual camera images, in the camera frame of reference.

A localization unit 1910 receives inputs from the GPS 1904. The localization unit 1910 is responsible for calculating the best-guess of the bale mover's pose (location and heading) in the map frame of reference. Inputs to the localization unit 1910 include absolute heading (e.g., 3° North of East), absolute position (e.g., 5 m north and 2 m east of the map frame origin), relative heading (also known as rotational velocity, e.g., 3° clockwise since last reading), and relative position (also known as forward velocity, 0.5 m forward of last position). The output of the localization unit 1910 is pose of the machine (used as origin of the base frame of reference), as the absolute position and the absolute heading within the map frame. The laser scanners 1270 and 1272 can be input to the world model 1908, such that the locations of objects in the vicinity of the bale mover are identified with respect to the map frame of reference. According to some embodiments, when the bale mover is within a specified distance (e.g., ~10 m) of a bale, output from the sensor 102 and laser scanners 1270 and 1272 can be directed to the localization unit 1920 so that detections are identified with respect to the base frame of reference, which alleviates issues of GPS drift and various localization inaccuracies, for example.

A world model 1908 stores bale locations in the map frame of reference. The world model, also referred to herein as a mapping module, takes individual detections from the perception unit 1906, transforms these detections into the map frame of reference with information from the TF unit 1912, and uses statistical models to determine the likely location of bales in the map frame of reference. The world model 1908 is responsible for setting the threshold of certainty (e.g., the ellipse of uncertainty) to pursue picking up the bale, and updating the locations of those bails as more information is gathered.

The TF unit 1912 is a utility of the ROS (Robot Operating System) which keeps track of the relationships between the various different frames of reference with respect to time. As discussed previously, embodiments of an autonomous bale mover use a multiplicity of reference frames, including a camera frame, a base frame, and a map frame. The TF unit 1912 takes in information about one frame of reference with respect to time and transforms this information relative to another frame of reference with respect to time. For example, the TF unit 1912 takes in information like "at time X, the origin of frame 'base' is at a certain Cartesian coordinate (5,28) relative to the origin of frame 'map', and at a 90° angle clockwise." The TF module 1912 outputs the same data, but at a requested time. The TF unit 1912 also handles transitive properties of projection (e.g., if frame X is at a Pose X within frame Y, and frame Y is at Pose Y within frame Z, where is frame X with relation to frame Z?). The TF unit 1912 also contains the static (never moves) location of the camera frame relative to the base frame.

Figure 20:
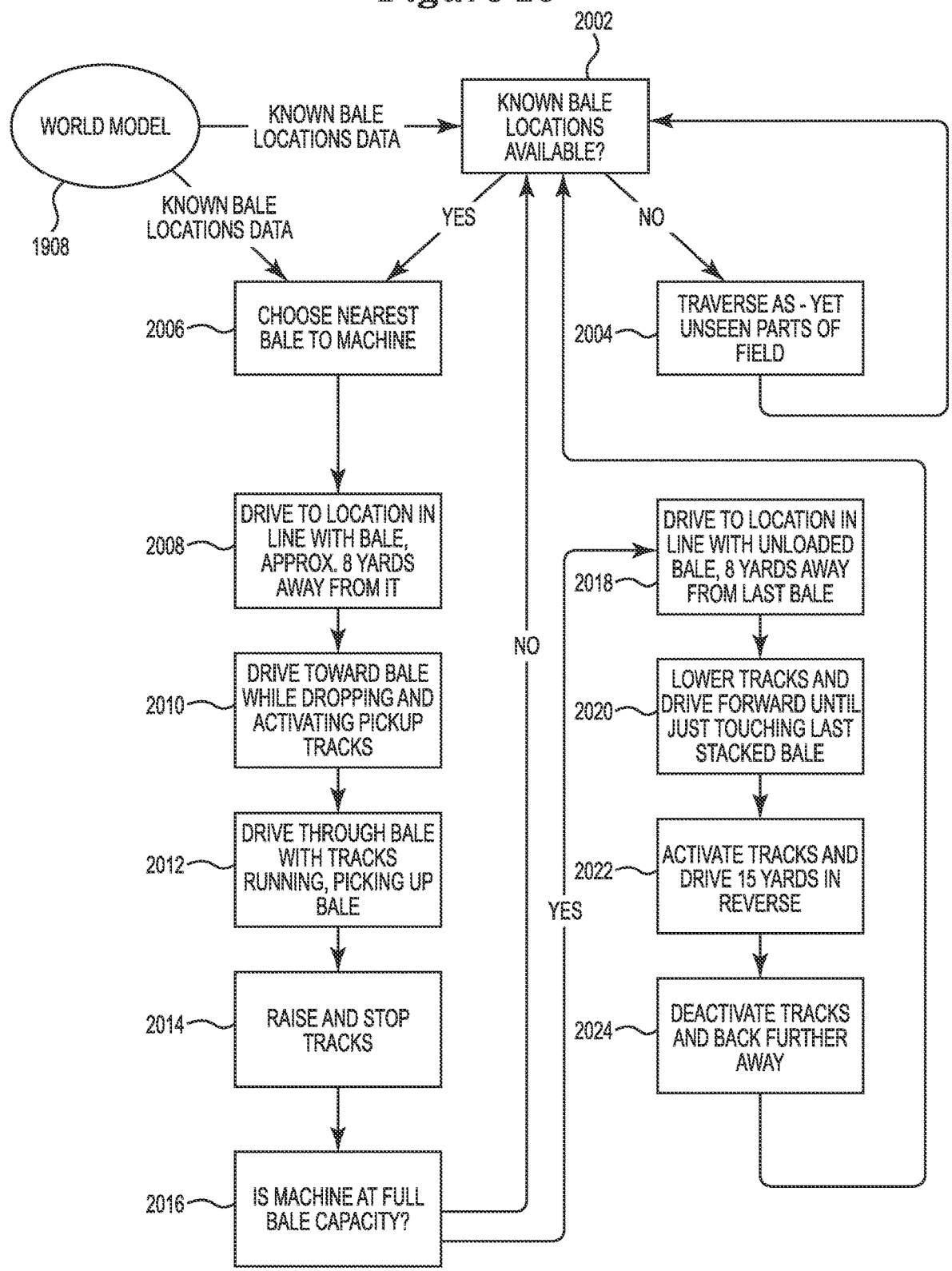
FIG. 20 is a flow chart illustrating various operations of an autonomous bale mover in accordance with various embodiments.

The primary autonomy state machine 1914 makes decisions based on the state of both the bale mover and the world model 1908 (see, e.g., the flow chart shown in FIG. 20). Outputs from the primary autonomy state machine 1914 include desired velocity, rotational velocity, and commands to raise, lower, start, and stop the bale pickup tracks (e.g., left and right tracks 1206 and 1212 shown in FIG. 12). The primary autonomy state machine 1914 is shown coupled to the world model 1908 and a CAN transmitter (TX) 1916.

The main computer 1246 also includes a CAN receiver (RX) 1918. The CAN TX 1916 and CAN RX 1918 are part of a Controller Area Network (CAN bus) of the bale mover. The CAN TX 1916/RX 1918 is the software unit which communicates on the CAN bus with the microcontroller-based machine control unit 1932. A representative CAN TX 1916/RX 1918 unit is a Universal Transceiver Model No. B424-A, available from Vermeer Corporation, Pella Iowa.

The CAN TX 1916 and CAN RX 1918 of the main computer 1902 are coupled to a CAN controller 1934 of the microcontroller-based machine control unit 1932. A representative machine control unit 1932 is Controller Model No. C248, available from Vermeer Corporation. The CAN controller 1934 mirrors the utility of the CAN TX 1916 and CAN RX 1918. The CAN controller 1934 receives commands (e.g., desired velocity, desired rotational velocity) from the CAN TX 1916 and issues messages to a hardware state machine 1936. The CAN controller 1934 produces various outputs (e.g., left wheel speed, right wheel speed, command Ack/Nack) which are received by the CAN RX 1918. Using the outputs received from the CAN controller 1934, the CAN RX 1918 communicates velocity and rotational velocity to the localization unit 1910 of the main computer 1246. The machine control unit 1930 produces a number of outputs that are received by various hardware components 1950 of the bale mover. The machine control unit 1930 also receives input information from the hardware components 1950.

The hardware state machine 1936 of the machine control unit 1930 controls the state of discrete outputs 1940, 1942, 1944, which control different hydraulic valves of the bale mover. For example, the discrete outputs 1940 and 1942 control discrete hydraulic valves 1956 and 1958 which cooperate to control the movement of a bed tilt cylinder 1209 of the bale mover. The bed tilt cylinder 1209 raises and lowers the bale loading system 1202 shown in FIG. 12, for example. A discrete output 1944 cooperates with a discrete hydraulic valve 1962 to control the bale track engage circuit 1968. The bale track engage circuit 1968 controls actuation of the left and right tracks 1206 and 1212 of the bale loading system 1202 shown in FIG. 12, for example.

The machine control unit 1930 includes a PID (proportional-integral-derivative) controller or loop 1914. The PID controller 1914 continuously calculates an error value as the difference between a desired setpoint and a measured process variable. The PID controller 1938 receives velocity and rotational velocity from the CAN controller 1934, and produces outputs to a first H-bridge output 1946 and a second H-bridge output 1948. The output of the first H-bridge output 1946 is communicated to a proportional hydraulic pump control 1952, which controls the left track motor 1964 of the left track drive 1265 shown in FIG. 12. The output of the second H-bridge output 1948 is communicated to a proportional hydraulic pump control 1954, which controls the right track motor 1966 of the right track drive 1267 shown in FIG. 12. The bale mover also includes wheel encoders 1962 which are coupled to a pulse frequency input 1949 of the machine control unit 1930. An output from the pulse frequency input 1949 is coupled to the PID controller 1914.

Hydraulic System

FIG. 23 illustrates a hydraulic system for an autonomous bale mover in accordance with various embodiments. The hydraulic system shown in FIG. 23 can be implemented on the autonomous bale mover illustrated in FIGS. 12-18, for example. As was discussed previously, the hydraulic system 1263 includes various hydraulic pumps, hydraulic motors, and hydraulic control valves. As is shown in FIG. 23, the hydraulic system 1263 includes a right hydraulic pump 2320 and a left hydraulic pump 2322. The right hydraulic pump 2320 is fluidically coupled to a front conveyor control valve 2304, and the left hydraulic pump 2322 is fluidically coupled to a rear conveyor control valve 2302. The front conveyor control valve 2304 is fluidically coupled to the left and right hydraulic motors 1205 and 1211 of the bale loading system 1202 (e.g., the front conveyor). The left and right hydraulic motors 1205 and 1211 of the bale loading system 1202 can be controlled to move the front left and right conveyor tracks 1206 and 1212 in forward and reverse directions. The rear conveyor control valve 2302 is fluidically coupled to the left and right hydraulic motors 1236 and 1246 of the bale carrying system 1230 (e.g., the rear conveyor). The left and right hydraulic motors 1236 and 1246 of the bale carrying system 1230 can be controlled to move the rear left and right conveyor tracks 1234 and 1244 in forward and reverse directions.

The right hydraulic pump 2320 is also fluidically coupled to a right hydraulic ground-drive motor 2312, which controls forward and reverse movement of the right ground-drive track 1268. The left hydraulic pump 2322 is fluidically coupled to a left hydraulic ground-drive motor 2314, which controls forward and reverse movement of the left ground-drive track 1266.

According to various embodiments, the engine 1262 drives an H1 Series tandem hydrostatic pump (right and left hydraulic pumps 2320 and 2322) manufactured by Danfoss. Each of the Danfoss hydraulic pumps 2320 and 2322 has 53.8 cc of displacement. The right and left ground-drive motors 2312 and 2314 can be MSE05-22.9 ci displacement motors manufactured by Poclain. The rear and front conveyor control valves 2302 and 2304 can be Hydraforce 4-port selector valves (three-position, closed center). These control valves 2302 and 2304 can pass oil straight through or divert the oil through the corresponding conveyor motors in series. The third position of the control valves 2302 and 2304 allows reversing of the conveyor motors which can be incorporated in some embodiments.

As can be seen in FIG. 23, the left hydraulic drive circuit and the rear conveyor tracks 1234 and 1244 are combined, and the right hydraulic drive circuit and the front conveyor tracks 1206 and 1212 are combined, but this is not a requirement. When normally driving through the field, the control valves 2302 and 2304 are in the neutral position, such that no oil passes through the conveyor motors 1205, 1211, 1236, and 1246. During bale pickup, the control valves 2302 and 2304 shift to pass oil in series to the conveyor motors 1205, 1211, 1236, and 1246 to turn them as well as the ground drive motors 2312 and 2314.

Operating Scenario—Example #1

FIG. 20 is a flow chart illustrating various operations of an autonomous bale mover in accordance with various embodiments. In FIG. 20, it is assumed that the world model 1908 provides known bale location data, and that the bale mover is operating within a predefined field. A check is made 2002 to determine if known bale locations are available from the world model 1908. If not, the autonomous bale mover traverses 2004 as-yet unseen parts of the field. If known bale locations are available, there may be a number of bale locations that are available. According to various embodiments, the bail location nearest the bale mover is selected 2006.

The bale mover drives 2008 to a location in line with the bale until it reaches a location approximately 8 yards away from the bale. While the bale mover continues to move towards the bale at this location (at the same speed or perhaps slowing down somewhat), the bale mover also lowers and activates the bale pick up tracks 1206 and 1212 of the bale loading system 1202 shown in FIG. 12. The bale mover continues to move toward the bale and engage the bale while moving forward (not stopping) with the bale arm tracks 1206 and 1212 running, thereby picking up the bale on the move.

After picking up the bale, the bale loading system 1202 is raised 2014 and the bale arm tracks 1206 and 1212 are stopped. A check is made 2016 to determine if the bale mover is at full bale capacity (e.g., n bales, where n is an integer between 2 and 9). For example, according to some embodiments, the bale mover is configured to load and carry three bales. If the bale mover is not currently at full capacity, a check is made 2002 on the availability of the next known bale location. If the bale mover is currently at full capacity, the bale mover drives 2018 to a predetermined stacking location. The bale mover drives in alignment with previously unloaded bales in the stacking area until a location about 8 yards away from the last bale is reached. At this point, the bale loading system 1202 is lowered and the bale mover drives forward until the bale mover touches the last stacked bale.

At this point, the left and right tracks 1206 and 1212 of the bale loading system 1202 and the left and right tracks 1234 and 1244 of the bale carrying system 1230 are activated. The bale mover then drives in a reverse direction for about 15 yards while the bales are unloaded from the bale mover. After reaching the 15 yard location, the tracks 1206 and 1212 of the bale loading system 1202 and the tracks 1234 and 1244 of the bale carrying system 1230 are deactivated, while the bale mover continues to back away from the bale stack. Processing continues with checking 2002 the availability of a known bale location.

Operating Scenario—Example #2

Figure 21:
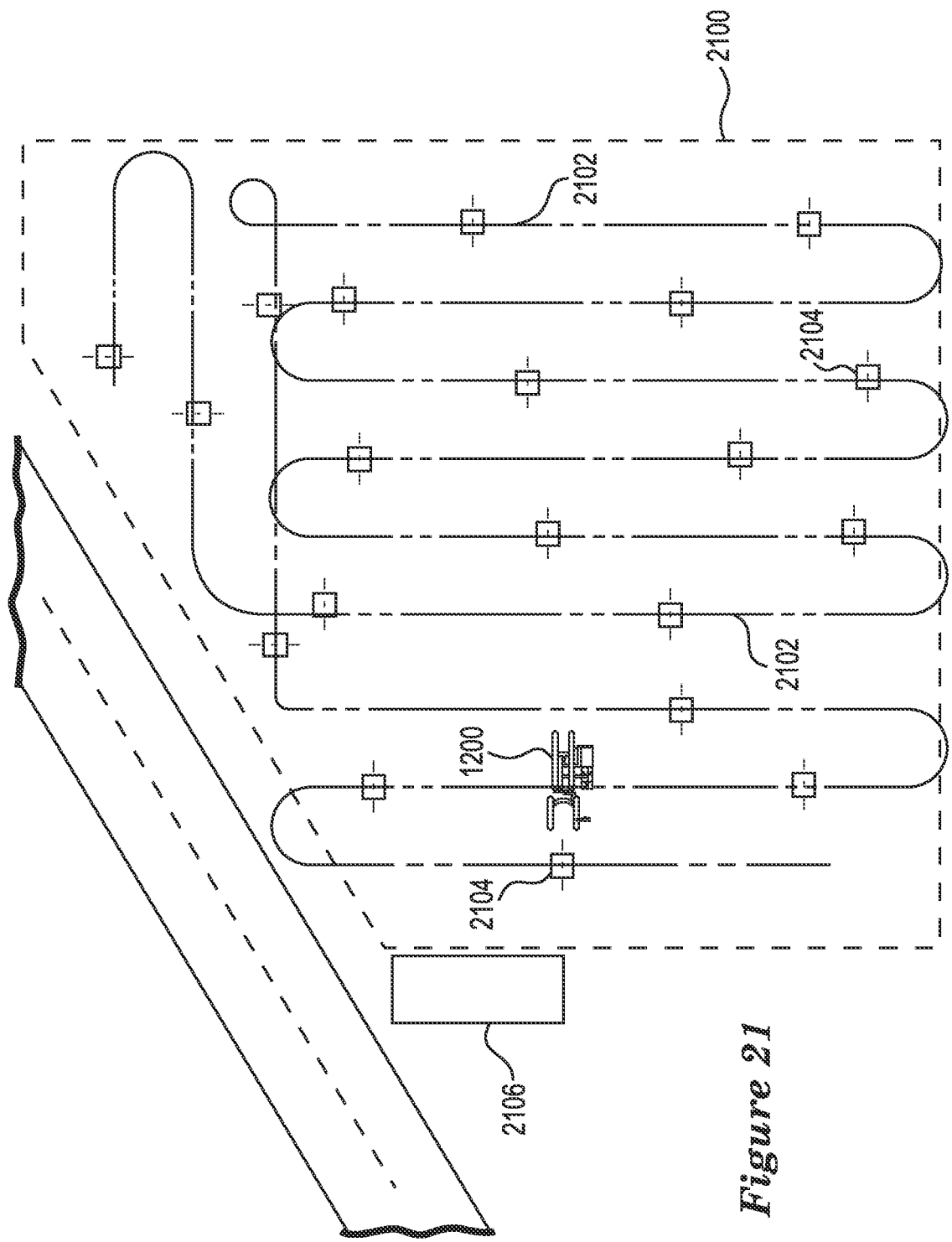
FIG. 21 illustrates an autonomous bale mover moving through a field and picking up bales in accordance with various embodiments.

FIG. 21 illustrates an autonomous bale mover 1200 moving through a field 2100 and picking up bales 2104 in accordance with various embodiments. The field 2100 is typically identified by a geo-fence in the world model within which the bale mover 1200 is free to operate. In FIG. 21, a number of bales 2004 are distributed along a route 2102 previously taken by a baler machine when creating the bales 2004. The objective of the bale mover 1200 is to pick up the bales 2104 in a time efficient manner, without stopping to pick up individual bales 2104. Given the distribution of the bales 2104 in FIG. 21, it would appear that the most efficient path through the field 2100 is in a direction generally orthogonal to the baler machine route 2102. The actual route taken by the bale mover 1200 can be based on the methodology illustrated in FIG. 20, for example, which uses a next-nearest bale approach for prioritizing the bales 2104 for pickup.

According to some embodiments, the bale mover 1200 can move through the field 2100 at an average speed of about 5 mph, with little or no slowdown when approaching and picking up bales 2104. In some embodiments, the bale mover 1200 can move at an average speed of about 4 to 8 MPH when contacting and picking up bales 2104, and move at a higher average speed of between 5 and 15 MPH when traversing relatively long distances between individual bales 2104 or to/from a predetermined stacking location 2106.

It is noted that an autonomous bale mover according to the disclosure does not require a consistent pattern of setting the bales in the field. For example, bales can be distributed randomly in the field or in a consistent pattern, with little difference in efficiency when picking up the bales in either scenario.

Operating Scenario—Example #3

Figure 22:
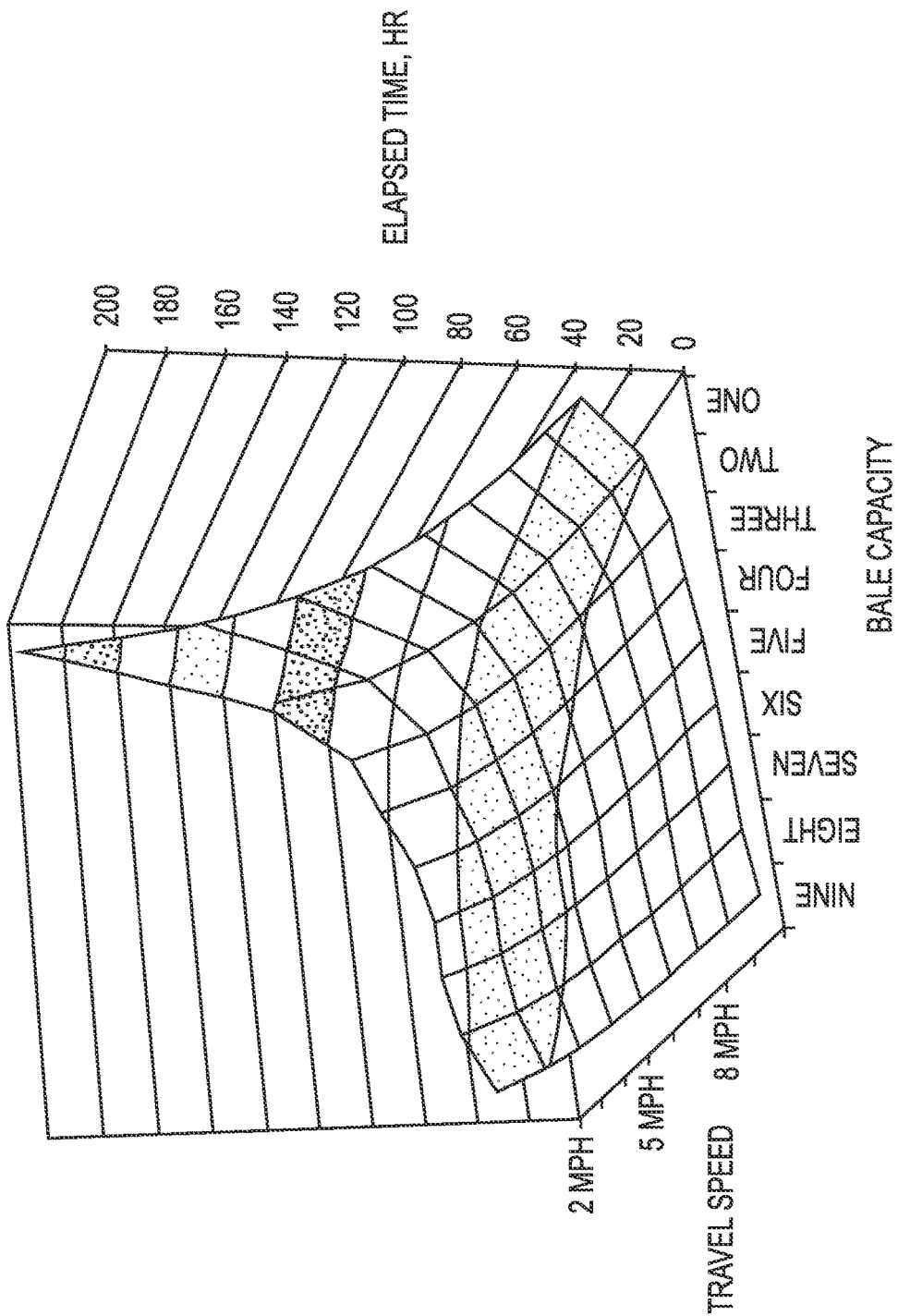
FIG. 22 is a three-dimensional graph showing the time to collect bales versus machine capacity and travel speed in accordance with various embodiments.

FIG. 22 is a three-dimensional graph showing the time to collect bales versus machine capacity and travel speed in accordance with various embodiments. In the graph shown in FIG. 22, the x-axis is bale capacity (maximum number of bales that can be carried by the bale mover), the y-axis is bale mover travel speed (mph), and the z-axis is elapsed time (hours). The graph shown in FIG. 22 is a summary of estimations of how long it would take to pick up bales off of the field for different bale capacities and bale mover speeds. It is to be understood that there are many variables, such as field size, stack location, field bale density, etc., that impact the estimations.

In FIG. 22, it is assumed that the field is 160 acres in area, there are 2.5 bales per acre with 30 foot rows. It was speculated that between about 30 and 40 hours would be the maximum time that users would deem reasonable to pick up bales in a 160 acre field in order to keep up with the baler machines that produced the bales. From the graph shown in FIG. 22, it can be seen that at an average of 5 mph, with a bale capacity of three, an autonomous bale mover could clear a typical 160 acre field in about 29 hours.

This document discloses numerous embodiments, including but not limited to the following:

Item 1 is a method, comprising:
  scanning a region of land using a sensor comprising stereo cameras;
  producing, by the sensor, an image and disparity data for the image;
  searching for a vertical object within the image using the disparity data;
  determining whether the vertical object is a bale of material using the image; and
  computing an orientation of the bale relative to the sensor using the disparity data.

Item 2 is the method of item 1, further comprising:
  producing modified disparity data by removing disparity data corresponding to the ground in the image; and
  searching for the vertical object within the region using the modified disparity data.

Item 3 is the method of item 1, wherein searching for the vertical object comprises searching for a vertical object having a height relative to the ground in the image that is greater than a threshold.

Item 4 is the method of item 1, wherein searching for the vertical object comprises scanning the image using a detection window having a predetermined size in terms of pixels.

Item 5 is the method of item 4, wherein the predetermined size of the detection window corresponds to a size of the bale at a given distance separating the vertical object from the sensor.

Item 6 is the method of item 1, wherein determining whether the vertical object is a bale comprises:
  extracting features of the vertical object; and
  classifying the vertical object using the extracted features.

Item 7 is the method of item 6, wherein classifying the vertical object comprises:
  classifying the vertical object using a plurality of classifiers; and
  determining that the vertical object is the bale in response to each of the plurality of classifiers successfully classifying the vertical object as the bale.

Item 8 is the method of item 1, wherein determining whether the vertical object is the bale comprises:
classifying, by a first classifier, the vertical object using first features of the object; and
if the first classifier indicates the vertical object is likely the bale, classifying, by a second classifier, the vertical object using second features of the object.

Item 9 is the method of item 8, wherein:
the first classifier comprises a first support vector machine;
the first features are Haar features;
the second classifier comprises a second support vector machine; and
the second features are HOG (Histogram of Oriented Gradients) features.

Item 10 is the method of item 1, wherein determining bale orientation comprises computing position of the bale relative to the sensor using the disparity data.

Item 11 is the method of item 1, wherein determining bale orientation comprises:
computing three-dimensional points (X, Y, Z) for the bale within the image using the disparity data;
projecting X and Z coordinates of the three-dimensional points to a two-dimensional (X-Z) plane corresponding to a top-down view of the bale;
determining a face of the bale and a side of the bale using the two-dimensional plane; and
computing an orientation of the bale relative to the sensor using the face of the bale.

Item 12 is the method of item 11, wherein determining the face and side of the bale comprises:
generating a first best fit line through points in the X-plane;
generating a second best fit line through points in the Z-plane; and
determining which of the first and second best fit lines represents the face of the bale.

Item 13 is the method of item 12, wherein:
determining which of the first and second best fit lines represents the face of the bale comprises determining disparity data variation for the first and second best fit lines; and
the best fit line with the smallest variation corresponds to the face of the bale.

Item 14 is the method of item 1, further comprising:
storing orientation and a position of the bale by a world model; and
updating the orientation and position of the bale in the world model in response to subsequent imaging of the bale by the sensor.

Item 15 is the method of item 1, further comprising:
receiving current orientation and current position of the bale by a world model;
determining variability of the current orientation and current position relative to orientation and position data previously stored in the world model for the bale; and
updating the orientation and position of the bale in the world model to include the current orientation and current position if the variability does not exceed a threshold.

Item 16 is the method of item 15, further comprising discarding the current orientation and current position if the variability exceeds the threshold.

Item 17 is an apparatus, comprising:
a sensor comprising a left camera and a right camera; and
a processor coupled to the sensor and configured to:
produce an image and disparity data for the image;
search for a vertical object within the image using the disparity data;
determine whether the vertical object is a bale of material using the image; and
compute an orientation of the bale relative to the sensor using the disparity data.

Item 18 is the apparatus of item 17, wherein the processor is configured to:
produce modified disparity data by removing disparity data corresponding to the ground in the image; and
search for the vertical object within the region using the modified disparity data.

Item 19 is the apparatus of item 17, wherein the processor is configured to search for a vertical object having a height relative to the ground in the image that is greater than a threshold.

Item 20 is the apparatus of item 17, wherein the processor is configured to search for the vertical object by scanning the image using a detection window having a predetermined size in terms of pixels.

Item 21 is the apparatus of item 20, wherein the predetermined size of the detection window corresponds to a size of the bale at a given distance separating the vertical object from the sensor.

Item 22 is the apparatus of item 17, wherein the processor is configured to determine whether the vertical object is a bale by:
extracting features of the vertical object; and
classifying the vertical object using the extracted features.

Item 23 is the apparatus of item 22, wherein the processor is configured to classify the vertical object by:
classifying the vertical object using a plurality of classifiers; and
determining that the vertical object is the bale in response to each of the plurality of classifiers successfully classifying the vertical object as the bale.

Item 24 is the apparatus of item 23, wherein the processor is configured to determine whether the vertical object is the bale by:
classifying, by a first classifier, the vertical object using first features of the object; and
if the first classifier indicates the vertical object is likely the bale, classifying, by a second classifier, the vertical object using second features of the object.

Item 25 is the apparatus of item 24, wherein:
the first classifier comprises a first support vector machine;
the first features are Haar features;
the second classifier comprises a second support vector machine; and
the second features are HOG (Histogram of Oriented Gradients) features.

Item 26 is the apparatus of item 17, wherein the processor is configured to determine bale orientation by computing position of the bale relative to the sensor using the disparity data.

Item 27 is the apparatus of item 17, wherein the processor is configured to determine bale orientation by:
computing three-dimensional points (X, Y, Z) for the bale within the image using the disparity data;
projecting X and Z coordinates of the three-dimensional points to a two-dimensional (X-Z) plane corresponding to a top-down view of the bale;
determining a face of the bale and a side of the bale using the two-dimensional plane; and
computing an orientation of the bale relative to the sensor using the face of the bale.

Item 28 is the apparatus of item 27, wherein the processor is configured to determine the face and side of the bale by:
generating a first best fit line through points in the X-plane;
generating a second best fit line through points in the Z-plane; and
determining which of the first and second best fit lines represents the face of the bale.

Item 29 is the apparatus of item 28, wherein the processor is configured to:
determine which of the first and second best fit lines represents the face of the bale by determining disparity data variation for the first and second best fit lines; and
the best fit line with the smallest variation corresponds to the face of the bale.

Item 30 is the apparatus of item 17, wherein the processor is configured to:
store orientation and a position of the bale by a world model; and
update the orientation and position of the bale in the world model in response to subsequent imaging of the bale by the sensor.

Item 31 is the apparatus of item 17, wherein the processor is configured to:
receive current orientation and current position of the bale by a world model;
determine variability of the current orientation and current position relative to orientation and position data previously stored in the world model for the bale; and
update the orientation and position of the bale in the world model to include the current orientation and current position if the variability does not exceed a threshold.

Item 32 is the apparatus of item 31, wherein the processor is configured to discard the current orientation and current position if the variability exceeds the threshold.

Item 33 is the apparatus of item 17, further comprising a bale mover, wherein the sensor and computer are components of the bale mover.

Item 34 is the apparatus of item 17, further comprising an autonomous bale mover, wherein the sensor and computer are components of the bale mover.

Item 35 is an autonomous bale mover, comprising:
an integral power system;
a ground-drive system;
a bale loading system;
a bale carrying system;
a control system capable of providing control signals for the ground-drive system to control the speed of and direction of travel of the bale mover and to control operation of the bale loading system and the bale carrying system; and
a sensor system for detecting the position and orientation of bales.

Item 36 is the autonomous bale mover of item 35, wherein:
the bale carrying system comprises a conveyor system that defines a longitudinal carrying axis, the conveyor system configured to hold a plurality of bales aligned end-to-end;
the bale loading system is configured to lift bales from the ground and to place them onto the bale carrying system;
the integral power system comprises an engine, a cooling system, and a hydraulic system and is positioned adjacent and laterally offset from the bale carrying system; and
the ground-drive system comprises a pair of tracks, a first track positioned adjacent the longitudinal carrying axis and a second track positioned adjacent the integral power system.

Item 37 is the autonomous bale mover of item 36, wherein:
the first track of the ground-drive system is positioned underneath the integral power system; and
the second track of the ground-drive system is positioned between left and right conveyor arms of the bale carrying system.

Item 38 is the autonomous bale mover of item 37, wherein the second track of the ground-drive system is biased toward the right conveyor arm of the bale carrying system.

Item 39 is the autonomous bale mover of item 35, wherein:
the bale loading system comprises a left conveyor track and a right conveyor track; and
the bale carrying system comprises a left conveyor track and a right conveyor track.

Item 40 is the autonomous bale mover of item 39, wherein:
the left and the right conveyor tracks of the bale loading system and the bale carrying system move in a reverse direction when loading bales onto the bale mover; and
the left and the right conveyor tracks of the bale loading system and the bale carrying system move in a forward direction when unloading bales from the bale mover.

Item 41 is the autonomous bale mover of item 35, wherein the control system comprises:
a main computer coupled to the sensors; and
a microcontroller-based machine control unit coupled to the main computer.

Item 42 is the autonomous bale mover of item 41, wherein:
the main computer comprises a CAN transmitter and a CAN receiver; and
the machine control unit comprises a CAN controller.

Item 43 is the autonomous bale mover of item 42, wherein the machine control unit comprises a PID controller and a hardware state machine respectively coupled to the CAN controller.

Item 44 is the autonomous bale mover of item 41, wherein the machine control unit comprises a plurality of outputs each coupled to a hydraulic pump control or a hydraulic valve of the bale mover.

Item 45 is the autonomous bale mover of item 44, wherein:
a first output is coupled to a first hydraulic pump control that controls a left track motor of the bale mover;
a second output is coupled to a second hydraulic pump control that controls a right track motor of the bale mover;
a third output and a fourth output are coupled to respective first and second hydraulic valves that are coupled to a bed tilt cylinder that controls raising and lowering of the bale loading system; and
a fifth output coupled to a third hydraulic valve which is coupled to a bale track engage circuit for operating conveyor tracks of the bale loading system and the bale carrying system.

Item 46 is the autonomous bale mover of item 35, wherein the sensor system comprises a stereo camera system.

Item 47 is the autonomous bale mover of item 46, wherein the sensor system comprises a processor coupled to the stereo camera system, the processor configured to: produce an image and disparity data for the image;
search for a vertical object within the image using the disparity data;
determine whether the vertical object is a bale of material using the image; and
compute the position and orientation of the bale relative to the bale mover using the disparity data.

Item 48 is the apparatus of item 47, wherein the processor is configured to:
produce modified disparity data by removing disparity data corresponding to the ground in the image; and search for the vertical object within the region using the modified disparity data.

Item 49 is the apparatus of item 47, wherein the processor is configured to search for a vertical object having a height relative to the ground in the image that is greater than a threshold.

Item 50 is the apparatus of item 47, wherein the processor is configured to search for the vertical object by scanning the image using a detection window having a predetermined size in terms of pixels.

Item 51 is the apparatus of item 50, wherein the predetermined size of the detection window corresponds to a size of the bale at a given distance separating the vertical object from the sensor.

Item 52 is the apparatus of item 47, wherein the processor is configured to determine whether the vertical object is a bale by:
 extracting features of the vertical object; and
 classifying the vertical object using the extracted features.

Item 53 is the apparatus of item 52, wherein the processor is configured to classify the vertical object by:
 classifying the vertical object using a plurality of classifiers; and
 determining that the vertical object is the bale in response to each of the plurality of classifiers successfully classifying the vertical object as the bale.

Item 54 is the apparatus of item 53, wherein the processor is configured to determine whether the vertical object is the bale by:
 classifying, by a first classifier, the vertical object using first features of the object; and
 if the first classifier indicates the vertical object is likely the bale, classifying, by a second classifier, the vertical object using second features of the object.

Item 55 is the apparatus of item 54, wherein:
 the first classifier comprises a first support vector machine;
 the first features are Haar features;
 the second classifier comprises a second support vector machine; and
 the second features are HOG (Histogram of Oriented Gradients) features.

Item 56 is the apparatus of item 47, wherein the processor is configured to determine bale orientation by computing position of the bale relative to the sensor using the disparity data.

Item 57 is the apparatus of item 47, wherein the processor is configured to determine bale orientation by:
 computing three-dimensional points (X, Y, Z) for the bale within the image using the disparity data;
 projecting X and Z coordinates of the three-dimensional points to a two-dimensional (X-Z) plane corresponding to a top-down view of the bale;
 determining a face of the bale and a side of the bale using the two-dimensional plane; and
 computing an orientation of the bale relative to the sensor using the face of the bale.

Item 58 is the apparatus of item 57, wherein the processor is configured to determine the face and side of the bale by:
 generating a first best fit line through points in the X-plane;
 generating a second best fit line through points in the Z-plane; and
 determining which of the first and second best fit lines represents the face of the bale.

Item 59 is the apparatus of item 58, wherein the processor is configured to:
 determine which of the first and second best fit lines represents the face of the bale by determining disparity data variation for the first and second best fit lines; and
 the best fit line with the smallest variation corresponds to the face of the bale.

Item 60 is the apparatus of item 47, wherein the processor is configured to:
 store orientation and a position of the bale by a world model; and
 update the orientation and position of the bale in the world model in response to subsequent imaging of the bale by the sensor.

Item 61 is the apparatus of item 47, wherein the processor is configured to:
 receive current orientation and current position of the bale by a world model;
 determine variability of the current orientation and current position relative to orientation and position data previously stored in the world model for the bale; and
 update the orientation and position of the bale in the world model to include the current orientation and current position if the variability does not exceed a threshold.

Item 62 is the apparatus of item 61, wherein the processor is configured to discard the current orientation and current position if the variability exceeds the threshold.

Item 63 is the apparatus of item 35, further comprising proximity sensor for sensing objects in proximity of the bale mover.

Item 64 is the apparatus of item 63, wherein the proximity sensors comprise laser scanners.

Item 65 is the apparatus of item 63, wherein the proximity sensors comprise ultrasonic sensors.

Item 66 is the apparatus of item 63, wherein:
 at least a first proximity sensor is situated on one side of the bale mover; and
 at least a second proximity sensor is situated on the other side of the bale mover.

Item 67 is the apparatus of item 63, wherein the proximity sensors provide about 360° of proximity sensing around the periphery of the bale mover.

Item 68 is the apparatus of item 63, wherein the control system is configured to adjust one or both of the speed and travel direction of the bale mover in response to signals produced by the proximity sensors.

Item 69 is the apparatus of item 68, wherein the control system is configured to reduce the speed of or stop the bale mover in response to signals produced by the proximity sensors to avoid contact with an object other than a bale.

Item 70 is a method implemented with use of an autonomous bale mover, comprising:
 defining a region within which the autonomous bale mover operates;
 locating bales distributed within the region by the bale mover as the bale mover moves through the region;
 picking up located bales by the bale mover without stopping;
 transporting picked-up bales to a predetermined stacking location within the region by the bale mover; and
 continuing to locate and pick up bales within the region by the bale mover until all bales within the region are transported to the predetermined stacking location.

Item 71 is the method of item 70, wherein defining the region comprises defining a geo-fence around the region within which the autonomous bale mover operates.

Item 72 is the method of item 70, wherein the bale mover picks up a predetermined number of bales and then transports the predetermined number of bales to the predetermined stacking location.

Item 73 is the method of item 72, where the predetermined number of bales is a number between 2 and 9.

Item 74 is the method of item 72, where the predetermined number of bales is a number between 3 and 5.

Item 75 is the method of item 70, wherein picking up the bales is implemented using a next-nearest bale methodology.

Item 76 is the method of item 70, wherein the bale mover unloads the picked-up bales in rows at the predetermined stacking location.

Item 77 is the method of item 70, wherein locating the bales comprises distinguishing between a face of the bales and a side of the bales.

Item 78 is the method of item 70, wherein locating the bales comprises orienting the bale mover relative to a face of the bales when picking up the bales.

Item 79 is the method of item 70, wherein picking up the bales comprises:

picking up the bales using a bale loading system of the bale mover; and conveying the picked-up bales from the bale loading system to a bale carrying system of the bale mover.

Item 80 is the method of item 79, wherein conveyor tracks of the bale loading system pick up the bales and convey the picked-up bales to the bale carrying system.

Item 81 is the method of item 80, wherein conveyor tracks of the bale carrying system move picked-up bales received from the bale loading system toward the back of the bale carrying system.

Item 82 is the method of item 70, wherein locating the bales comprises visually locating the bales using a stereo camera system.

Item 83 is the method of item 82, wherein visually locating the bales comprises detecting vertical objects in images produced by the stereo camera system and determining whether the vertical objects are bales.

Item 84 is the method of item 83, wherein detecting vertical objects in the images comprises scanning disparity maps of the images using a detection window having a size corresponding to a size of the bales at a given distance separating the vertical objects from the bale mover.

Item 85 is the method of item 83, wherein determining whether the vertical objects are bales comprises:

extracting features of the vertical objects; and classifying the vertical objects using the extracted features.

Item 86 is the method of item 85, wherein classifying the vertical object comprises:

classifying the vertical objects using a plurality of classifiers; and determining that the vertical objects is the bale in response to each of the plurality of classifiers successfully classifying the vertical objects as bales.

Item 87 is the method of item 83, wherein determining whether the vertical object is the bale comprises:

classifying, by a first classifier, the vertical objects using first features of the objects; and if the first classifier indicates the vertical objects are likely bales, classifying, by a second classifier, the vertical objects using second features of the objects.

Item 88 is the method of item 87, wherein:

the first classifier comprises a first support vector machine;

the first features are Haar features;

the second classifier comprises a second support vector machine; and the second features are HOG (Histogram of Oriented Gradients) features.

Item 89 is the method of item 82, further comprising determining bale orientation by computing position of the bales relative to the stereo camera system using disparity data.

Item 90 is the method of item 89, wherein determining bale orientation comprises:

computing three-dimensional points (X, Y, Z) for the bales using the disparity data;

projecting X and Z coordinates of the three-dimensional points to a two-dimensional (X-Z) plane corresponding to a top-down view of the bales;

determining a face of the bales and a side of the bales using the two-dimensional plane; and computing an orientation of the bales relative to the sensor using the face of the bales.

Item 91 is the method of item 90, wherein determining the face and side of the bale comprises:

generating a first best fit line through points in the X-plane;

generating a second best fit line through points in the Z-plane; and determining which of the first and second best fit lines represents the face of the bales.

Item 92 is the method of item 91, wherein:

determining which of the first and second best fit lines represents the face of the bales comprises determining disparity data variation for the first and second best fit lines; and the best fit line with the smallest variation corresponds to the face of the bales.

Item 93 is the method of item 82, further comprising:

storing an orientation and a position of the bales by a world model; and updating the orientation and position of the bales in the world model in response to subsequent imaging of the bales by the stereo camera system.

Item 94 is the method of item 82, further comprising:

receiving current orientation and current position of the bales by a world model;

determining variability of the current orientation and current position relative to orientation and position data previously stored in the world model for the bales; and updating the orientation and position of the bales in the world model to include the current orientation and current position if the variability does not exceed a threshold.

Item 95 is the method of item 94, further comprising discarding the current orientation and current position if the variability exceeds the threshold.

The discussion and illustrations provided herein are presented in an exemplary format, wherein selected embodiments are described and illustrated to present the various aspects of the present invention. Systems, devices, or methods according to the present invention may include one or more of the features, structures, methods, or combinations thereof described herein. For example, a device or system may be implemented to include one or more of the advantageous features and/or processes described below. A device or system according to the present invention may be implemented to include multiple features and/or aspects illustrated and/or discussed in separate examples and/or illustrations. It is intended that such a device or system need not include all of the features described herein, but may be implemented to include selected features that provide for useful structures, systems, and/or functionality.

Although only examples of certain functions may be described as being performed by circuitry for the sake of brevity, any of the functions, methods, and techniques can be performed using circuitry and methods described herein, as would be understood by one of ordinary skill in the art.

What is claimed is:

1. A method, comprising
scanning a region of land using a sensor, the scanned region of land comprising ground and one or more objects, the sensor mounted to an autonomous bale mover including an integral power system, a ground-drive system, a bale loading system, and a bale carrying system;
producing, using a processor coupled to the sensor and mounted to the autonomous bale mover, a three-dimensional (3-D) point cloud;
searching for a vertical object within the 3-D point cloud;
determining that the vertical object within the 3-D point cloud is a bale of material; and
computing an orientation of the bale relative to the sensor by:
computing three-dimensional points (X, Y, Z) for the bale using 3-D point cloud data;
projecting X and Z coordinates of the three-dimensional points to a two-dimensional (X-Z) plane corresponding to a top-down view of the bale;
generating, from the X-Z plane with the projected coordinates, i) a first best fit line with relatively consistent disparity values, and ii) a second best fit line with varying disparity values;
determining, based on the relatively consistent disparity values, that the first best fit line represents a planar face of the bale;
determining, based on the varying disparity values, that the second best fit line represents a curved cylindrical side of the bale; and
computing the orientation of the bale relative to the sensor using the first best fit line that represents the planar face of the bale.

2. The method of claim 1, wherein the sensor comprises at stereo cameras, a laser scanner, and/or a LIDAR scanner.

3. The method of claim 1, wherein searching for the vertical object comprises searching for a vertical object having a height relative to the ground that is greater than a threshold.

4. The method of claim 1, wherein determining that the vertical object is the bale comprises:
extracting features of the vertical object;
classifying the vertical object using the extracted features and a classifier; and
determining that the vertical object is the bale in response to the classifier successfully classifying the vertical object as the bale.

5. The method of claim 1, further comprising:
storing orientation and a position of the bale by a world model; and
updating the orientation and position of the bale in the world model in response to subsequent scanning of the bale by the sensor.

6. The method of claim 1, further comprising:
receiving current orientation and current position of the bale by a world model;
determining variability of the current orientation and current position relative to orientation and position data previously stored in the world model for the bale; and
updating the orientation and position of the bale in the world model to include the current orientation and current position if the variability does not exceed a threshold.

7. An apparatus, comprising:
a sensor configured to scan a region of land comprising ground and one or more objects, the sensor mounted to an autonomous bale mover including an integral power system, a ground-drive system, a bale loading system, and a bale carrying system; and
a processor coupled to the sensor and mounted to the autonomous bale mover and configured to:
produce a three-dimensional (3-D) point cloud;
search for a vertical object within the 3-D point cloud;
determine that the vertical object within the 3-D point cloud is a bale of material; and
compute an orientation of the bale relative to the sensor by:
computing three-dimensional points (X, Y, Z) for the bale using 3-D point cloud data;
projecting X and Z coordinates of the three-dimensional points to a two-dimensional (X-Z) plane corresponding to a top-down view of the bale;
generating, from the X-Z plane with the projected coordinates, i) a first best fit line with relatively consistent disparity values, and ii) a second best fit line with varying disparity values;
determining, based on the relatively consistent disparity values, that the first best fit line represents a planar face of the bale;
determining, based on the varying disparity values, that the second best fit line represents a curved cylindrical side of the bale; and
computing the orientation of the bale relative to the sensor using the first best fit line that represents the planar face of the bale.

8. The apparatus of claim 7, wherein the sensor comprises stereo cameras.

9. The apparatus of claim 7, wherein the sensor comprises a laser scanner.

10. The apparatus of claim 7, wherein the sensor comprises a LIDAR scanner.

11. The apparatus of claim 7, wherein the processor is configured to search for a vertical object having a height relative to the ground that is greater than a threshold.

12. The apparatus of claim 7, wherein the processor is configured to:
extract features of the vertical object;
classify the vertical object using the extracted features and a classifier; and
determine that the vertical object is the bale in response to the classifier successfully classifying the vertical object as the bale.

13. The apparatus of claim 7, wherein the processor is configured to:
store orientation and a position of the bale by a world model; and
update the orientation and position of the bale in the world model in response to subsequent scanning of the bale by the sensor.

14. The apparatus of claim 7, wherein the processor is configured to:
- receive current orientation and current position of the bale by a world model;
- determine variability of the current orientation and current position relative to orientation and position data previously stored in the world model for the bale; and
- update the orientation and position of the bale in the world model to include the current orientation and current position if the variability does not exceed a threshold.

* * * * *